(12) United States Patent
Nagano

(10) Patent No.: US 9,402,012 B2
(45) Date of Patent: Jul. 26, 2016

(54) IMAGE-READING LENS, IMAGE-READING DEVICE, AND IMAGE-FORMING APPARATUS

(71) Applicant: Takuya Nagano, Yokohama (JP)

(72) Inventor: Takuya Nagano, Yokohama (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

(21) Appl. No.: 14/283,373

(22) Filed: May 21, 2014

(65) Prior Publication Data

US 2014/0347710 A1 Nov. 27, 2014

(30) Foreign Application Priority Data

May 23, 2013 (JP) ................................ 2013-109421

(51) Int. Cl.
| | |
|---|---|
| *H04N 1/028* | (2006.01) |
| *H04N 1/193* | (2006.01) |
| *H04N 1/00* | (2006.01) |
| *G02B 13/00* | (2006.01) |

(52) U.S. Cl.
CPC .......... *H04N 1/1935* (2013.01); *G02B 13/0045* (2013.01); *H04N 1/02815* (2013.01); *H04N 2201/0081* (2013.01); *H04N 2201/0091* (2013.01); *H04N 2201/0093* (2013.01)

(58) Field of Classification Search
None
See application file for complete search history.

(56) References Cited

U.S. PATENT DOCUMENTS

| | | | | |
|---|---|---|---|---|
| 4,253,736 A | * | 3/1981 | Momiyama ............ | G02B 15/12 359/675 |
| 5,329,403 A | * | 7/1994 | Fukasawa ..................... | 359/717 |
| 5,398,136 A | * | 3/1995 | Ohzawa ................. | G02B 13/06 359/714 |
| 6,091,901 A | * | 7/2000 | Ogawa ................... | G02B 15/16 359/357 |
| 2002/0101665 A1 | * | 8/2002 | Ohashi ................... | G02B 13/24 359/691 |
| 2003/0011830 A1 | * | 1/2003 | Miyatake ...................... | 358/513 |
| 2008/0117528 A1 | | 5/2008 | Yoneyama | |
| 2008/0278779 A1 | | 11/2008 | Nishina et al. | |
| 2009/0219630 A1 | * | 9/2009 | Yamamoto .................... | 359/708 |
| 2009/0219631 A1 | | 9/2009 | Ning | |

(Continued)

FOREIGN PATENT DOCUMENTS

| | | |
|---|---|---|
| CN | 101174021 A | 5/2008 |
| CN | 101685198 A | 3/2010 |

(Continued)

OTHER PUBLICATIONS

U.S. Appl. No. 14/203,835, filed Mar. 11, 2014.

(Continued)

*Primary Examiner* — Beniyam Menberu
(74) *Attorney, Agent, or Firm* — Oblon, McClelland, Maier & Neustadt, L.L.P.

(57) ABSTRACT

An image-reading lens includes front-group and rear-group lens systems which are arranged on an object side and an image side, respectively. The front-group lens system includes equal to or less than 5 lenses which include at least one positive lens and at least one negative lens, and the rear-group lens system includes one negative lens. An angle of view of an entire system of the image-reading lens is equal to or more than 56°. The front-group and rear-group lens systems are structured such that with respect to a change in a distance between the front-group and rear-group lens systems, a change in a focal length of the entire system of the image-reading lens is small, and a change in an image plane is large, and by adjusting the distance between the front-group and rear-group lens systems, a required lens performance is obtained.

8 Claims, 8 Drawing Sheets

(56) References Cited

U.S. PATENT DOCUMENTS

| | | | |
|---|---|---|---|
| 2009/0257125 A1* | 10/2009 | Take | 359/557 |
| 2010/0073779 A1 | 3/2010 | Wang et al. | |
| 2010/0182704 A1* | 7/2010 | Yamashita | G03B 13/00 359/684 |
| 2013/0242362 A1 | 9/2013 | Nakayama et al. | |
| 2013/0250436 A1* | 9/2013 | Ori | 359/684 |
| 2013/0335588 A1* | 12/2013 | Matsusaka | G02B 3/00 348/220.1 |

FOREIGN PATENT DOCUMENTS

| | | | |
|---|---|---|---|
| JP | 2002-082282 | 3/2002 | |
| JP | 2002-296499 * | 10/2002 | G02B 13/24 |
| JP | 2008-281859 | 11/2008 | |

OTHER PUBLICATIONS

Chinese Office Action dated Dec. 24, 2015 for corresponding Chinese Application No. 201410220001.7 and English translation thereof.

* cited by examiner

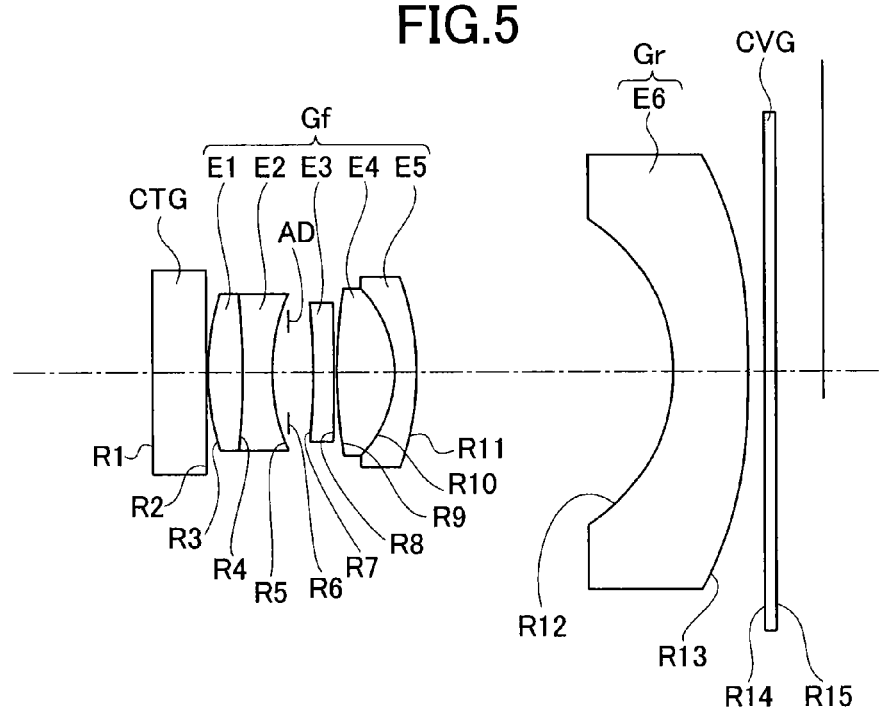
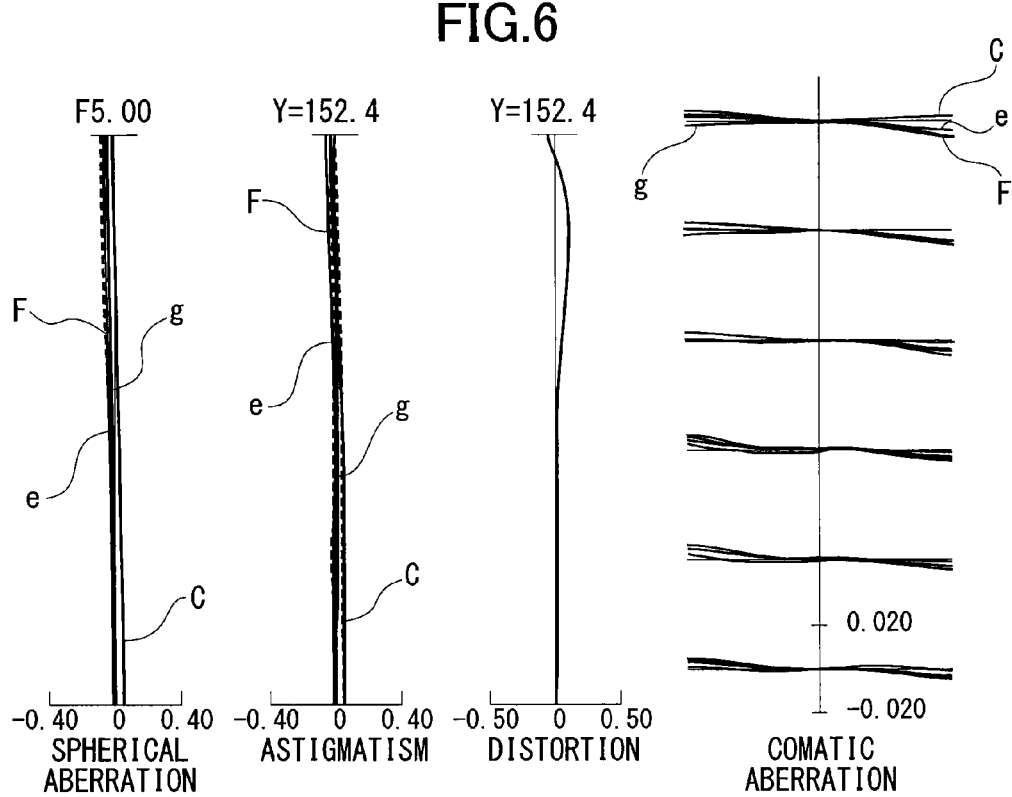

IMAGE-READING LENS, IMAGE-READING DEVICE, AND IMAGE-FORMING APPARATUS

CROSS-REFERENCE TO RELATED APPLICATIONS

The present application is based on and claims priority from Japanese Patent Application Number 2013-109421, filed May 23, 2013, the disclosure of which is hereby incorporated by reference herein in its entirety.

BACKGROUND

The present invention relates to an image-reading lens for image reading which is suitable for capturing a manuscript image in image-reading devices such as an image scanner, and the like, and image-forming apparatuses such as a fax machine, a digital copier, and the like. In particular, the present invention relates to a small and high-performance image-reading lens having a small number of lenses, relates to an image-reading device using such an image-reading lens, and relates to an image-forming apparatus using such an image-reading device.

In an image-reading device in an image scanner, a fax machine, a digital copier, and the like used for manuscript image reading, an optical image of a manuscript to be read is reduced and formed by an image-reading lens for reading, this reduced optical image is imaged by a solid-state image sensor such as a CCD (Charge-Coupled Device) image sensor, and image information is converted to electronic image data. Additionally, in order to read manuscript information in color, a solid-state image sensor using a so-called 3-line CCD image sensor in which light-receiving elements each having, for example, red, green, and blue filters are arranged in three lines is structured, on its light-receiving surface, a reduced optical image of a manuscript is formed, three-primary-color separation is performed, and color image information is converted to signals.

In the above image-reading lens, generally, high contrast in a high spatial frequency region on an image plane, and an almost 100% aperture efficiency to a peripheral portion of an angle of view are demanded. Additionally, in order to favorably read a color manuscript, on a light-receiving surface, image-forming positions of red, green, and blue colors are needed to coincide in an optical axis direction, and chromatic aberration of each color has to be corrected excellently.

Traditionally, a so-called Gauss-type image-reading lens widely used as such an image-reading lens makes it possible to realize a relatively large diameter, and high resolution. However, in order to realize high performance which has been demanded recently with a Gauss-type lens structure, the number of lenses equal to or more than 6 lenses such as a lens structure having 6 lenses in 4 groups, a lens structure having 8 lenses in 5 groups, and the like is needed.

On the other hand, Japanese Patent Number 3939908 discloses an image-reading lens in which the number of lenses is smaller compared to a Gauss-type lens and which has performance equal to or higher than that of the Gauss-type lens, and has a lens structure having 3 to 5 lenses.

That is, the image-reading lens disclosed in Japanese Patent Number 3939908 realizes an optical system in which the number of lenses in the lens structure is 3 at minimum, a lens which is located on a most image side has negative power, and the lens is located adjacent to an image plane, which makes it easy to correct various aberrations and possible to realize high performance.

SUMMARY

As described above, Japanese Patent Number 3939908 discloses an optical system which has a structure in which a lens structure requires a smaller number of 3 to 5 lenses, a lens which is located on a most image side has negative power, and the lens is located adjacent to an image plane, and therefore, it is easy to correct various aberrations and possible to realize high performance.

However, Japanese Patent Number 3939908 only discloses an example of a lens having an approximately 45° angle of view at a maximum. That is, in Japanese Patent Number 3939908, demands for a wider angle of view of an image-reading lens and easier correction of various aberrations along with miniaturization of an image-reading device and high-speed image reading in recent years are not described, and there is no optical system which has equal to or more than a 56° angle of view and favorably corrects various aberrations.

An object of the present invention is to provide a high-picture-quality image-reading lens in which an angle of view is equal to or more than 56°, the number of lenses is equal to or smaller than that of a Gauss-type lens, and which maintains miniaturization, and makes it possible to easily correct various aberrations.

In order to achieve the above object, an embodiment of the present invention provides an image-reading lens for reading a manuscript image, comprising: a front-group lens system which is arranged on an object side, and is constituted of less than or equal to 5 lenses which include equal to or more than one positive lens and equal to or more than one negative lens; and a rear-group lens system which is arranged on an image side, and is constituted of one negative lens, wherein an angle of view of an entire system of the image-reading lens is equal to or more than 56°, and the front-group lens system and the rear-group lens system are structured such that with respect to a change in a distance between the front-group lens system and the rear-group lens system, a change in a focal length of the entire system of the image-reading lens is small, and a change in an image plane is large, and a required lens performance is obtained by adjusting the distance between the front-group lens system and the rear-group lens system, wherein the image-reading lens is configured to satisfy the following conditional expressions [1], [2], and [3]:

$$-1.00 \leq fr/f < -0.50 \quad [1]$$

$$1.0 < (Rc+Rb)/(Rc-Rb) < 1.5 \quad [2]$$

$$1.0 < Ra/Rb < 2.8 \quad [3]$$

where fr is a focal length of the rear-group lens system, f is a focal length of the entire system of the image-reading lens, Ra is a curvature radius of a lens surface on the image side of a lens on a most image side of the front-group lens system, Rb is a curvature radius of a lens surface on the object side of the negative lens of the rear-group lens system, and Rc is a curvature radius of a lens surface on the image side of the negative lens of the rear-group lens system.

BRIEF DESCRIPTION OF THE DRAWINGS

FIG. 5 is a cross-sectional diagram illustrating a structure of Example 1 of an image-reading lens according to a fifth embodiment of the present invention.

FIG. 6 illustrates aberration diagrams of spherical aberration, astigmatism, distortion, and comatic aberration of the image-reading lens in FIG. 5.

DETAILED DESCRIPTION OF THE PREFERRED EMBODIMENTS

Figure 1:
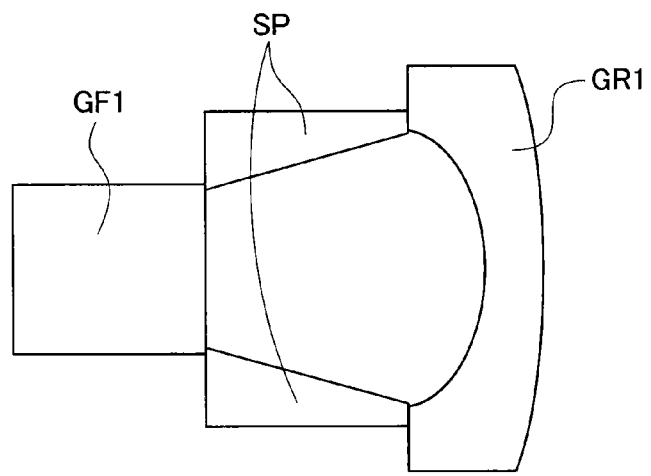
FIG. 1 is a diagram of an adjustment mechanism illustrating a schematic structure of an image-reading lens including an adjustment mechanism for a distance between a front-group lens system and a rear-group lens system according to a first embodiment of the present invention.

Hereinafter, based on embodiments of the present invention, an image-reading lens, an image-reading device, and an image-forming apparatus will be explained in detail with reference to the drawings. Before explaining specific examples, principle embodiments of the present invention will be explained.

As described above, a widely-known Gauss-type image-reading lens realizes a relatively large diameter and high resolution. However, in order to realize high performance, which has been demanded recently, with the Gauss-type image-reading lens, an increase in the number of lenses of a lens structure and an increase in size of an optical system along therewith are unavoidable. Consequently, there is an image-reading lens disclosed in Japanese Patent Number 3939908 in which compared to the Gauss-type image-reading lens, the number of lenses of the lens structure is smaller, and is 3 to 5, and which is capable of obtaining performance equal to or higher than that of the Gauss-type image-reading lens.

However, in Japanese Patent Number 3939908, only an example of a lens having a 45° angle of view at a maximum is disclosed. That is, in Japanese Patent Number 3939908, demands for a wider angle of view of an image-reading lens and easier correction of various aberrations along with miniaturization of an image-reading device and high-speed image reading in recent years are not described, and obtaining equal to or more than a 56° angle of view and favorable correction of various aberrations are not studied.

Therefore, in an image-reading lens for reading a manuscript image according to a first embodiment of the present invention, on an object side and an image side, a front-group lens system and a rear-group lens system are arranged, respectively, the front-group lens system is constituted of equal to or less than 5 lenses which include equal to or more than one positive lens and equal to or more than one negative lens, and the rear-group lens system is constituted of one negative lens. The image-reading lens is basically structured such that an angle of view of an entire system of the image-reading lens is equal to or more than 56°, the front-group lens system and the rear-group lens system are structured such that with respect to a change in a distance between the front-group lens system and the rear-group lens system, a change in a focal length of the entire system of the image-reading lens is small, and a change in an image plane is large, and a required lens performance can be obtained by adjusting the distance between the front-group lens system and the rear-group lens system.

That is, it is possible to obtain a small and high-performance image-reading lens in which the angle of view is equal to or more than 56°, the entire lens is constituted of equal to or less than 6 lenses, and lens performance is effectively adjustable between the front-group lens system and the rear-group lens system. In particular, in such a lens having a wide angle of view of equal to or more than 56°, an amount of aberration correction of each lens is large, and therefore, by satisfying conditions as described above, it is possible to effectively adjust the lens performance between the front-group lens system and the rear-group lens system.

In this case, the front-group lens system and the rear-group lens system may be held by a common holder, or the front-group lens system and rear-group lens system may be held by a front-group holder and a rear-group holder, respectively, and additionally a connector which integrally connects each of those holders may be included. In the former case of holding the front-group lens system and the rear-group lens system by the common holder, as an adjustment mechanism which is provided between the front-group lens system and the rear-group lens system, an interval ring can be used. In the latter case of connecting each of the front-group holder and the rear-group holder (each of individual holders for the front-group lens system and the rear-group lens system) by the connector, as an adjustment mechanism which is provided between the front-group lens system and the rear-group lens system, a method where an adjuster is inserted in a connected portion, each holder is pressed against the adjuster, and the distance is adjusted to a required distance, a method where a slide adjustment mechanism or the like for mutual position adjustment is provided in at least either of each holder and the connector, a slide position is adjusted, and the distance is adjusted to a required distance, or a method where a slide mechanism and an adjusted position-fixing mechanism are provided in at least either of each holder and the connector, and the distance is adjusted and fixed to a required distance can be used. Additionally, the front-group holder and the rear-group holder (the individual holders for the front-group lens system and the rear-group lens system) are adhered and fixed to each other, and they can also double the adjustment mechanism by a method where the distance is adjusted to a required distance by adjusting an adhered position.

Additionally, if individual holders which hold the front-group lens system and the rear-group lens system, respectively, are capable of independently adjusting a rotational position with respect to an optical axis, by relatively rotating the front-group lens system and the rear-group lens system, it is also possible to correct a tilt of an image plane by eccentricity, or the like.

Furthermore, in the above structure, miniaturization is achieved by using a negative lens for a lens on a most image side of the rear-group lens system. Because the negative lens is used for the lens on the most image side, an object distance is lengthened, and an image distance is shortened. Thus, restriction on arrangement of mirrors, or the like is reduced, and it is possible to achieve miniaturization of the image-reading device as a whole. In each later-described example (each of Examples 1 to 3) which describes a structure of an image-reading lens, when a back focal length which is a length on the optical axis from a lens surface on the image side of the negative lens of the rear-group lens system to the image plane is BF, and an entire lens length is D, a value of BF/D is 0.13 to 0.21.

Furthermore, by satisfying the following conditional expression [1], the above image-reading lens makes it possible to reduce a change in a focal length by the adjustment of the distance between the front-group lens system and the rear-group lens system, and prevent a change in a conjugate length. And therefore, it is possible to achieve further miniaturization of the image-reading lens, and structure the entire image-reading device which uses the image-reading lens in a small size.

$$-1.00 < fr/f < -0.50 \quad [1]$$

Here, fr is a focal length of the rear-group lens system, and f is a focal length of the entire image-reading lens system.

The conditional expression [1] defines a ratio of the focal length of the rear-group lens system to the focal length of the entire image-reading lens system.

In the conditional expression [1], when a value of fr/f is larger than an upper limit value of the conditional expression [1], a change in a focal length by the change in the distance between the front-group lens system and the rear-group lens system is too large, and adjustment is difficult. When a value of fr/f is smaller than a lower limit value of the conditional expression [1], power of the negative lens of the rear lens group is too small overall, and it is difficult to perform a favorable aberration correction in a wide-angle lens having an equal to more than 56° angle of view.

Note that it is important to prevent a change in a conjugate length in order to miniaturize an optical system. Especially, in a case of a wide-angle lens in which miniaturization is intended, by satisfying the conditional expression [1] in the above structure, when adjustment is performed by the distance between the front-group lens system and the rear-group lens system, it is possible to suppress the change in the focal length small, and therefore, it is possible to make the change in the conjugate length smaller, maintain miniaturization, and obtain high picture quality.

Furthermore, in the image-reading lens according to the embodiment of the present invention, by satisfying the following conditional expressions [2] and [3], it is possible to appropriately obtain an amount of the change in the image plane in the adjustment by the distance between the front-group lens system and the rear-group lens system.

$$1.0 < (Rc+Rb)/(Rc-Rb) < 1.5 \quad [2]$$

$$1.0 < Ra/Rb < 2.8 \quad [3]$$

Here, Ra is a curvature radius of a lens surface on the image side of the lens on the most image side of the front-group lens system, Rb is a curvature radius of a lens surface on an object side of the negative lens of the rear-group lens system, and Rc is a curvature radius of a lens surface on the image side of the negative lens of the rear-group lens system.

The conditional expression [2] defines a lens shape of the negative lens of the rear-group lens system of the image-reading lens, and the conditional expression [3] defines a ratio of the curvature radius of the lens surface on the image side of the lens on the most image side of the front-group lens system to the curvature radius of the lens surface on the object side of the negative lens of the rear-group lens system.

In the conditional expression [2], when a value of (Rc+Rb)/(Rc−Rb) is larger than an upper limit value of the conditional expression [2], curvature of the lens surface on an object side of the negative lens of the rear-group lens system and curvature of the lens surface on the image side of the lens on the most image side of the front-group lens system are too close, a change in an off-axis meridional ray becomes small, and it is difficult to perform correction of a tilt of the image plane by the distance between the front-group lens system and the rear-group lens system.

Additionally, when a value of (Rc+Rb)/(Rc−Rb) is smaller than a lower limit value of the conditional expression [3], the curvature of the lens surface on an object side of the negative lens of the rear-group lens system is stronger, and it is difficult to perform favorable aberration correction.

Additionally, in the conditional expression [3], by making a value of Ra/Rb within a range between an upper limit value and an lower limit value of the conditional expression [3], it is possible to obtain a favorable amount of the change in the image plane in the adjustment by the distance between the front-group lens system and the rear-group lens system.

That is, in the above structure of the image-reading lens, by satisfying the conditional expressions [2] and [3] by the lens shape of the negative lens of the rear-group lens system and a relationship between the lens surface on the image side of the lens on the most image side of the front-group lens system and the lens surface on the object side of the negative lens of the rear-group lens system, it is possible to obtain a favorable amount of a change in an off-axis image plane by the adjustment of the distance between the front-group lens system and the rear-group lens system, and by the adjustment of the distance between the front-group lens system and the rear-group lens system, it is possible to adjust the image plane, and obtain high picture quality.

Furthermore, by satisfying the following conditional expression [4], the image-reading lens according to the embodiment of the present invention makes it possible to achieve further miniaturization.

$$0.2 < ds/D < 0.6 \quad [4]$$

Here, ds is a distance on the optical axis between the front-group lens system and the rear-group lens system, and D is an entire lens length.

The conditional expression [4] defines a ratio of the distance on the optical axis between the front-group lens system and the rear-group lens system to an entire length of the image-reading lens.

In the conditional expression [4], when a value of ds/D is larger than an upper limit value of the conditional expression [4], the entire length of the image-reading lens increases, and therefore, the image-reading lens becomes larger. When a value of ds/D is smaller than a lower limit value of the conditional expression [4], a diameter of the front-group lens system becomes larger, and the image-reading lens becomes larger, and therefore, a rise in cost Occurs.

Furthermore, by satisfying the following conditional expression [5], the image-reading lens according to the embodiment of the present invention makes it possible to achieve a further favorable off-axis aberration correction.

$$0.12 < (øb - øa)/2ds < 0.28 \quad [5]$$

Here, øa is an effective diameter of the lens surface on the image side of the lens on the most image side of the front-group lens system, øb is an effective diameter of the lens surface on the object side of the negative lens of the rear-group lens system, and ds is the distance on the optical axis between the front-group lens system and the rear-group lens system.

The conditional expression [5] defines a ratio of a difference between the effective diameter of the lens surface on the image side of the lens on the most image side of the front-group lens system and the effective diameter of the lens surface on the object side of the negative lens of the rear-group lens system to the distance on the optical axis between the front-group lens system and the rear-group lens system.

In the conditional expression [5], if a value of (øb−øa)/2ds deviates from a range of values of the conditional expression [5], a sharp curve of an off-axis ray occurs on the lens surface on the object side and a lens surface on the image side of the negative lens of the rear-group lens system, and it is difficult to achieve a favorable aberration correction.

Furthermore, in the image-reading lens according to the embodiment of the present invention, at least one surface of the negative lens which constitutes the rear-group lens system is preferably aspherical. Thus, by making at least one surface of the negative lens of the rear-group lens system aspherical, it is possible to effectively correct distortion of an image by distortion.

Furthermore, in the image-reading lens according to the embodiment of the present invention, at least one surface of a plurality of lenses which constitute the front-group lens system is preferably aspherical. By making at least one surface of the plurality of lenses which constitute the front-group lens system aspherical, it is possible to more effectively correct aberration.

In addition, in the image-reading lens according to the embodiment of the present invention, since a light-receiving element array which constitutes an image sensor is arranged on the image plane, an outer shape of the negative lens which constitutes the rear-group lens system may be a shape which is not rotationally symmetric to the optical axis, and furthermore, the outer shape is preferably a shape of a strip of paper, an oval shape, or the like which is longer in a main-scanning direction than in a sub-scanning direction.

When trying to obtain high picture quality with such a structure as the above image-reading lens, a lens diameter of the rear-group lens system tends to become excessively large; however, in a case where a light-receiving element array is used as an image sensor, it is only necessary to ensure the size where a ray passes only in a single direction corresponding to a main-scanning direction which is a direction of arrangement of light-receiving elements. Therefore, as to a sub-scanning direction which is perpendicular to the arrangement of the light-receiving elements, the size of the image-reading lens can be smaller than the lens diameter, and it is possible to achieve miniaturization as a whole.

Needless to say, the outer shape of the negative lens which constitutes the rear-group lens system can be rotationally symmetric to the optical axis. Additionally, in this case, an entire picture of an image can be read concurrently by using an area sensor as the image sensor.

Furthermore, in each later-described image-reading device according to an eighth embodiment and a ninth embodiment of the present invention, an illumination system which illuminates a manuscript, an image-forming lens which forms a reduced image of reflected light of the manuscript illuminated by the illumination system, and an image sensor which photoelectrically-converts the reduced image of the manuscript formed by the image-forming lens are included, and the above image-reading lens is used as the image-forming lens, and therefore, it possible to obtain a high-performance image-reading device which is small and capable of effectively correcting a decrease of accuracy of image reading along with a change in temperature.

Additionally, in a later-described image-forming apparatus according to a tenth embodiment of the present invention, an image-reading device which reads a manuscript image and obtains electronic image data, and an image output device which forms and outputs a two-dimensional image based on the image data on an output medium such as paper, or the like are included, and the image-reading device in the image-forming apparatus is constituted of an image-reading device which uses the above image-reading lens as an image-forming lens.

The image-forming apparatus is structured by using the image-reading device which includes the above image-reading lens as an image-forming lens, and therefore, it possible to obtain a high-performance image-forming apparatus which is small and capable of effectively correcting a decrease of accuracy of image reading along with a change in temperature.

First Embodiment

Figure 2:
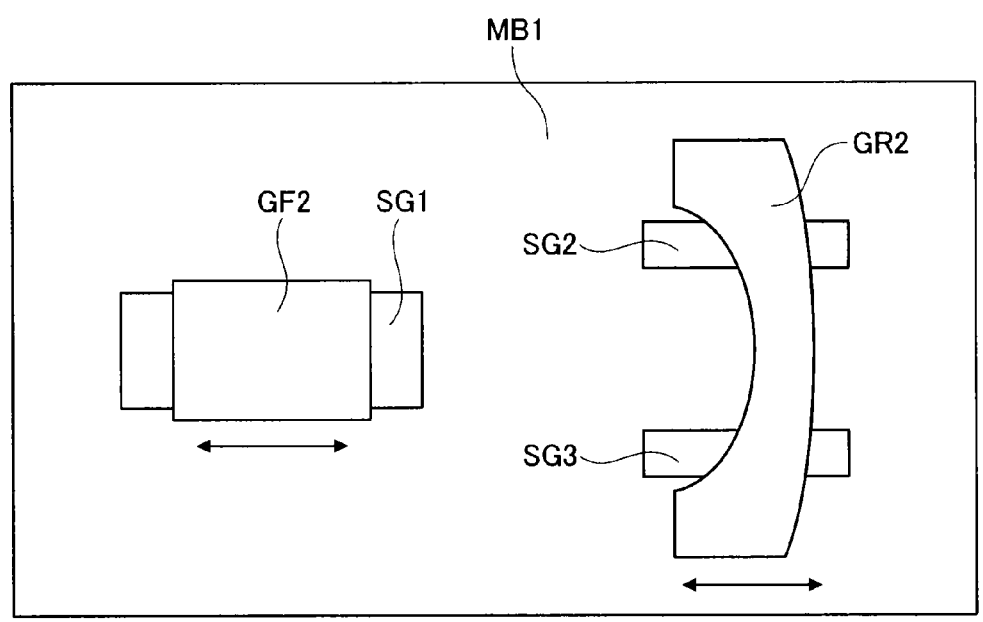
FIG. 2 is a diagram of an adjustment mechanism illustrating a schematic structure of a main part of an image-reading lens including an adjustment mechanism for a distance between a front-group lens system and a rear-group lens system according to a second embodiment of the present invention.
Figure 3:
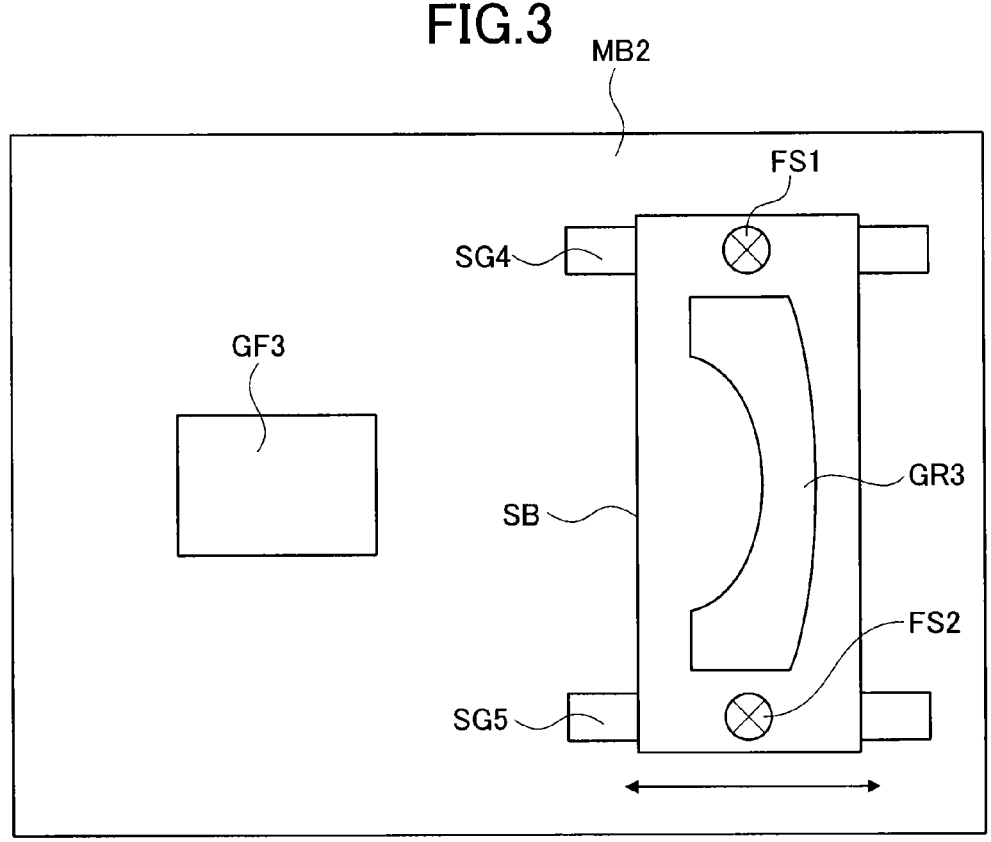
FIG. 3 is a diagram of an adjustment mechanism illustrating a schematic structure of a main part of an image-reading lens including an adjustment mechanism for a distance between a front-group lens system and a rear-group lens system according to a third embodiment of the present invention.
Figure 4:
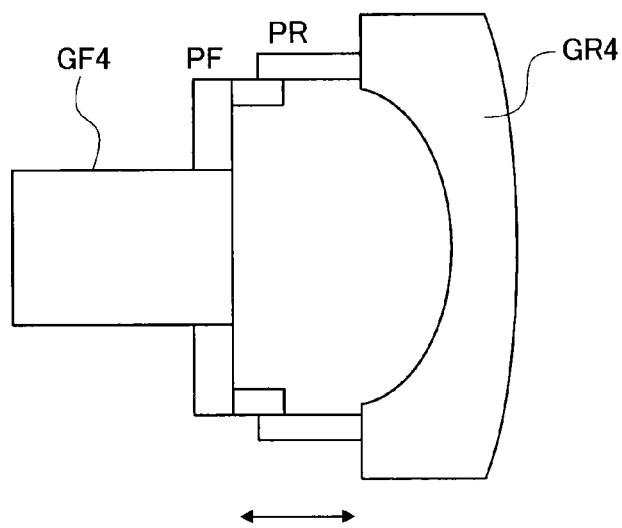
FIG. 4 is a diagram of an adjustment mechanism illustrating a schematic structure of a main part of an image-reading lens including an adjustment mechanism for a distance between a front-group lens system and a rear-group lens system according to a fourth embodiment of the present invention.

Next, a plurality of embodiments of the present invention will be explained in order. Each of the first to fourth embodiments of the present invention is an embodiment regarding an adjustment mechanism for a distance between a front-group lens system and a rear-group lens system of an image-reading lens. FIG. 1 is a diagram of an adjustment mechanism for a distance between a front-group lens system and a rear-group lens system of an image-reading lens according to the first embodiment of the present invention. FIG. 2 is a diagram of an adjustment mechanism for a distance between a front-group lens system and a rear-group lens system of an image-reading lens according to the second embodiment of the present invention. FIG. 3 is a diagram of an adjustment mechanism for a distance between a front-group lens system and a rear-group lens system of an image-reading lens according to the third embodiment of the present invention. FIG. 4 is a diagram of an adjustment mechanism for a distance between a front-group lens system and a rear-group lens system of an image-reading lens according to the fourth embodiment of the present invention.

In each of the first to fourth embodiments, a structure of the adjustment mechanism for the distance between the front-group lens system and the rear-group lens system is exemplified.

The image-reading lens illustrated in FIG. 1 includes a front-group lens system GF1, a rear-group lens system GR1, and an adjuster SP.

That is, in order to obtain a structure having an equal to or more than 56° angle of view, the image-reading lens is structured such that the front-group lens system GF1 and the rear-group lens system GR1 are arranged on an object side and an image side, respectively, the front-group lens system GF1 is constituted of equal to or less than 5 lenses which include equal to or more than one positive lens and equal to or more than one negative lens, the rear-group lens system GR1 is constituted of one negative lens, the entire image-reading lens is constituted of equal to or less than 6 lenses, a change in a focal length by a change in a distance between the front-group lens system GF1 and the rear-group lens system GR1 is small, and a change in an image plane is large. And therefore, it is possible to perform adjustment by the distance between the front-group lens system GF1 and the rear-group lens system GR1, and realize a small and high-performance image-reading lens.

In particular, in a lens having an equal to or more than 56° angle of view as described above, an amount of aberration correction of each lens is large, and by satisfying the above condition, the adjustment by the distance between the front-group lens system GF1 and the rear-group lens system GR1 is made possible.

The front-group lens system GF1 and the rear-group lens system GR1 may be held by a common holder, or a front-group holder which holds the front-group lens system, a rear-group holder which holds the rear-group lens system, and a connector which integrally connects those holders may be provided.

In the image-reading lens according to the first embodiment illustrated in FIG. 1, as the adjustment mechanism which is arranged between the front-group lens system GF1 and the rear-group lens system GR1 in a case of holding the front-group lens system GF1 and the rear-group lens system GR1 by the common holder, as illustrated in FIG. 1, an adjuster SP such as an interval ring, or the like is used. The adjuster SP is interposed between the front-group lens system GF1 and the rear-group lens system GR1, the front-group lens system GF1 and the rear-group lens system GR1 are pressed against either side of the adjuster SP, and a mutual distance between the front-group lens system GF1 and the rear-group lens system GR1 are adjusted by the adjuster SP. By selectively using adjusters which are different in thickness in the optical axis direction, it is possible to adjust the mutual distance between the front-group lens system GF1 and the rear-group lens system GR1.

Second Embodiment

FIG. 2 schematically illustrates a conceptual structure of an image-reading lens according to the second embodiment of the present invention as seen from above.

The image-reading lens illustrated in FIG. 2 includes a front-group lens system GF2, a rear-group lens system GR2, and a base MB1.

That is, similar to the first embodiment, in order to obtain a structure having an equal to or more than 56° angle of view, the image-reading lens is structured such that the front-group lens system GF2 and the rear-group lens system GR2 are arranged on an object side and an image side, respectively, the front-group lens system GF2 is constituted of equal to or less than 5 lenses which include equal to or more than one positive lens and equal to or more than one negative lens, the rear-group lens system GR2 is constituted of one negative lens, the entire image-reading lens is constituted of equal to or less than 6 lenses, a change in a focal length by a change in a distance between the front-group lens system GF2 and the rear-group lens system GR2 is small, and a change in an image plane is large. And therefore, it is possible to perform adjustment by the distance between the front-group lens system GF2 and the rear-group lens system GR2, and it is possible to realize a small and high-performance image-reading lens.

In the image-reading lens according to the second embodiment, as a connector which integrally holds and connects the front-group lens system GF2 and the rear-group lens system GR2, a base MB1 as a common base of the front-group lens system GF2 and the rear-group lens system GR2 is provided. The base MB1 is provided with a slide guide SG1, and slide guides SG2 and SG3. By the slide guide SG1 as a groove, or the like, the front-group lens system GF2 is held such that displacement in the optical axis direction is adjustable. Likewise, by the slide guides SG2 and SG3 as two grooves, or the like, the rear-group lens system GR2 is held such that displacement in the optical axis direction is adjustable. The displacement in the optical axis direction of the front-group lens system GF2 is adjusted by the slide guide SG1 of the base MB1, and the displacement in the optical axis direction of the rear-group lens system GR2 is adjusted by the slide guides SG2 and SG3, and therefore, it is possible to adjust a mutual distance between the front-group lens system GF2 and the rear-group lens system GR2.

Third Embodiment

FIG. 3 schematically illustrates a conceptual structure of an image-reading lens according to the third embodiment of the present invention as seen from above.

The image-reading lens illustrated in FIG. 3 includes a front-group lens system GF3, a rear-group lens system GR3, a slide base SB, and a base MB2.

That is, in order to obtain a structure having an equal to or more than 56° angle of view, the image-reading lens is structured such that the front-group lens system GF3 and the rear-group lens system GR3 are arranged on an object side and an image side, respectively, the front-group lens system GF3 is constituted of equal to or less than 5 lenses which include equal to or more than one positive lens and equal to or more than one negative lens, the rear-group lens system GR3 is constituted of one negative lens, the entire image-reading lens is constituted of equal to or less than 6 lenses, a change in a focal length by a change in a distance between the front-group lens system GF3 and the rear-group lens system GR3 is small, and a change in an image plane is large. And therefore, it is possible to perform adjustment by the distance between the front-group lens system GF3 and the rear-group lens system GR3, and realize a small and high-performance image-reading lens.

In the image-reading lens according to the third embodiment illustrated in FIG. 3, as a connector which integrally holds and connects the front-group lens system GF3 and the rear-group lens system GR3, a base MB2 as a common base of the front-group lens system GF3 and the rear-group lens system GR3 is provided.

The front-group lens system GF3 is integrally fixed and held by the base MB2. The rear-group lens system GR3 is integrally fixed and held by the slide base SB. The base MB2 is provided with slide guides SG4 and SG5 as two grooves, or the like. The slide base SB to which the rear-group lens system GR3 is fixed is held such that by the slide guides SG4 and SG5, displacement in the optical axis direction is adjustable, and the slide base SB is fixed at an adjusted position by fixing screws FS1 and FS2. That is, by adjusting a position of the slide base SB to which the rear-group lens system GR3 is fixed in the optical axis direction by the slide guides SG4 and SG5, and fixing the slide base SB to the base MB2 by the fixing screws FS1 and FS2, it is possible to adjust and fix a mutual distance between front-group lens systems GF3 and the rear-group lens system GR3.

Note that in FIG. 3, a structure is shown in which the front-group lens system GR3 is fixed to the base MB2, and a position of the rear-group lens system GR3 is adjusted to the base MB2 via the slide base SB; however, for example, the rear-group lens system GR3 may be fixed to the base MB2, and a position of the front-group lens system GR3 may be adjusted to the base MB2 via a slide base.

Fourth Embodiment

FIG. 4 schematically illustrates a conceptual structure of an image-reading lens according the fourth embodiment of the present invention.

The image-reading lens illustrated in FIG. 4 includes a front-group lens system GF4, a rear-group lens system GR4, a front-group adhering protrusion PF and a rear-group adhering protrusion PR.

That is, in order to obtain a structure having an equal to or more than 56° angle of view, the image-reading lens is structured such that the front-group lens system GF4 and the rear-group lens system GR4 are arranged on an object side and an image side, respectively, the front-group lens system GF4 is constituted of equal to or less than 5 lenses which include equal to or more than one positive lens and equal to or more than one negative lens, the rear-group lens system GR4 is constituted of one negative lens, the entire image-reading lens is constituted of equal to or less than 6 lenses, a change in a focal length by a change in a distance between the front-group lens system GF4 and the rear-group lens system GR4 is small, and a change in an image plane is large. And therefore, it is possible to perform adjustment by the distance between the front-group lens system GF4 and the rear-group lens system GR4, and realize a small and high-performance image-reading lens.

In the image-reading lens according the fourth embodiment, as a connector which integrally holds and connects the front-group lens system GF4 and the rear-group lens system GR4, the front-group adhering protrusion PF which protrudes in an outer circumferential direction and backward in the optical axis direction from the front-group lens system GF4, and the rear-group adhering protrusion PR which protrudes forward in the optical axis direction from the rear-group lens system GR4 are provided.

A distance between the front-group lens system GF4 and the rear-group lens system GR4 is adjusted and set, and as described in FIG. 4, the front-group adhering protrusion PF and the rear-group adhering protrusion PR are adhered to each other, connected and held, and therefore it is possible to adjust and fix a mutual distance between the front-group lens system GF4 and the rear-group lens system GR4.

Additionally, as described above, if rotations of the front-group lens system and the rear-group lens system with respect to the optical axis are adjustable concurrently with adjustment of the mutual distance between the front-group lens system and the rear-group lens system, by rotating the front-group lens system with respect to the rear-group lens system, it is possible to correct a tilt of the image plane because of eccentricity, or the like.

EXAMPLE 1

Fifth Embodiment

Next, a specific example (an example of numerical values) of an image-reading lens according to the fifth embodiment of the present invention will be explained.

Figure 7:
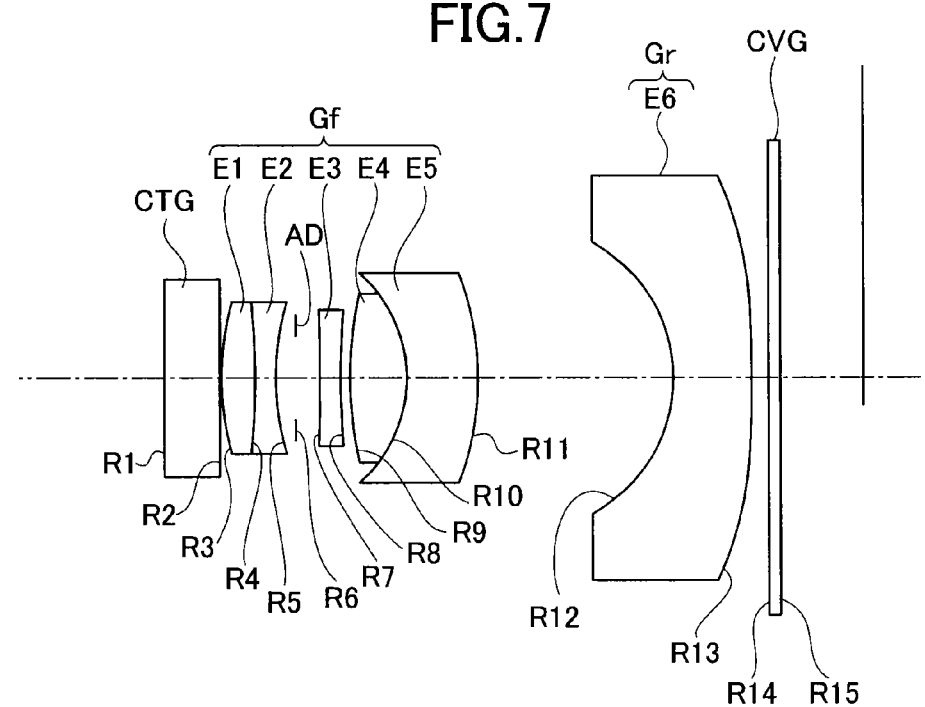
FIG. 7 is a cross-sectional diagram illustrating a structure of a main part of Example 2 of an image-reading lens according to a sixth embodiment of the present invention.
Figure 8:
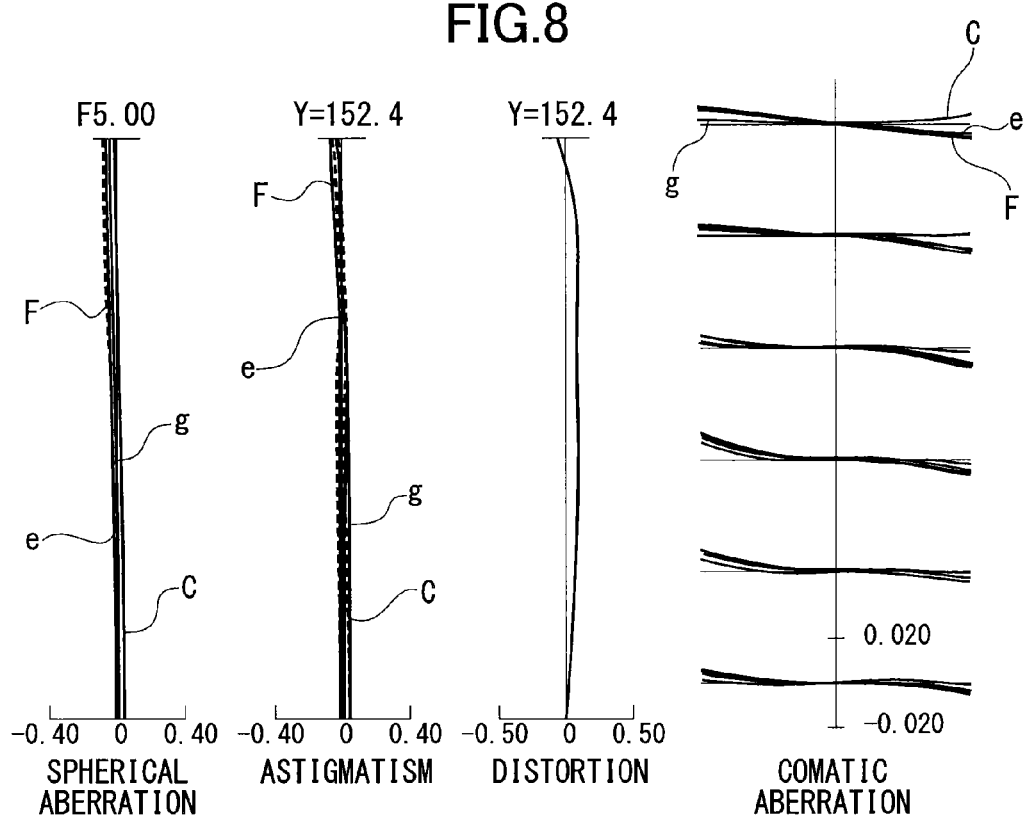
FIG. 8 illustrates aberration diagrams of spherical aberration, astigmatism, distortion, and comatic aberration of the image-reading lens in FIG. 7.
Figure 9:
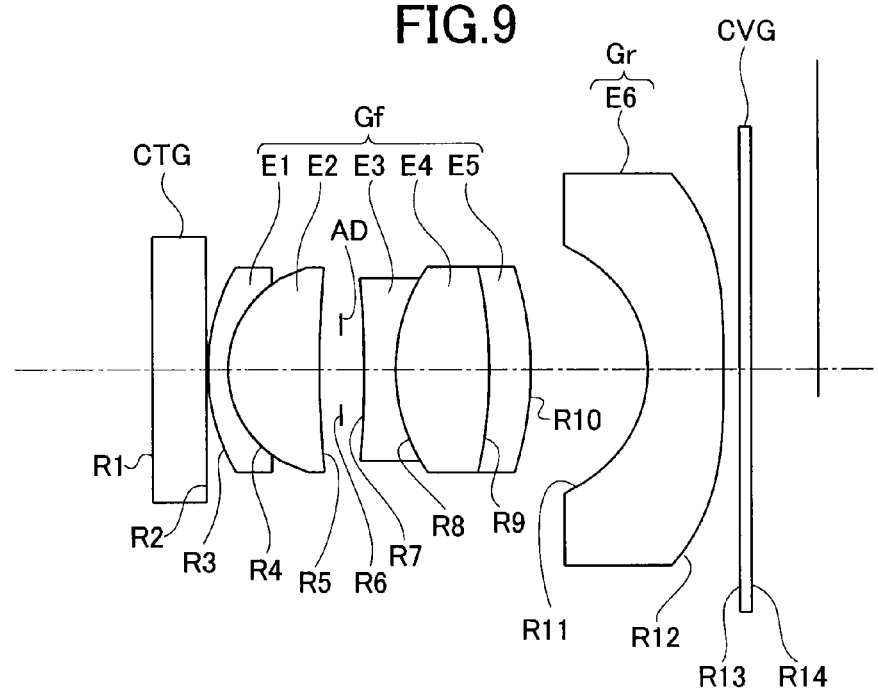
FIG. 9 is a cross-sectional diagram illustrating a structure of Example 3 of an image-reading lens according to a seventh embodiment of the present invention.
Figure 10:
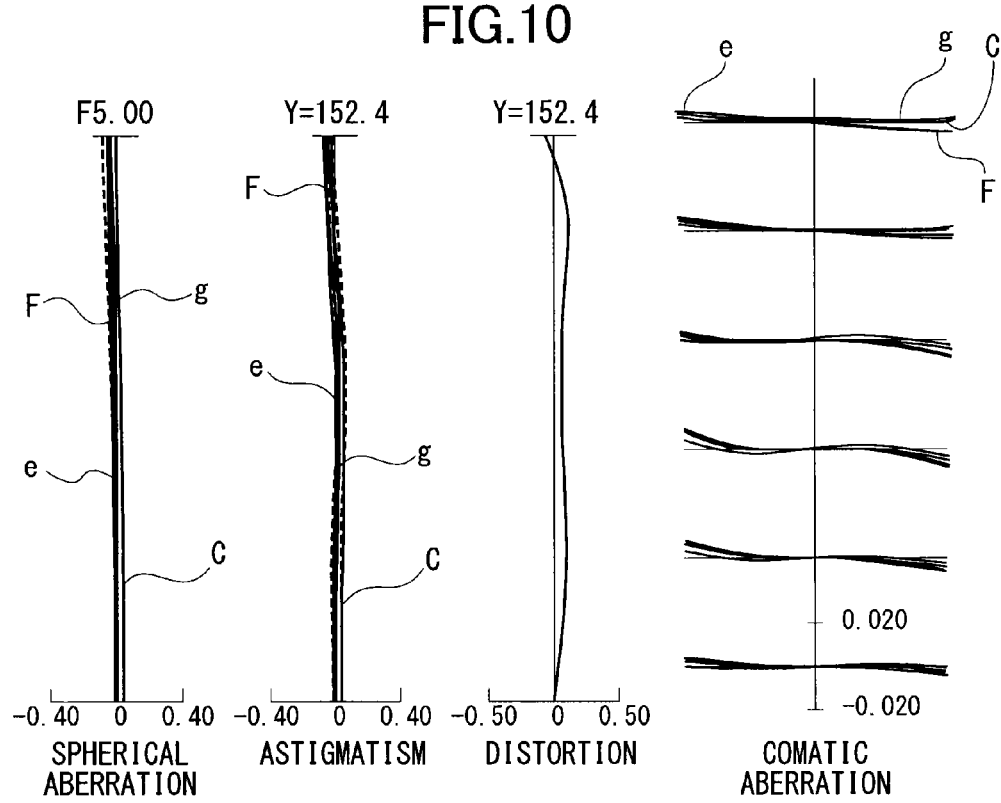
FIG. 10 illustrates aberration diagrams of spherical aberration astigmatism, distortion, comatic aberration of the image-reading lens in FIG. 9.

Examples 1 to 3 are examples of specific structures by examples of numerical values of image-reading lenses according to the fifth to seventh embodiments of the present invention. FIGS. 5 and 6 are diagrams which explain the fifth embodiment of the present invention, and an image-reading lens in Example 1. FIGS. 7 and 8 are diagrams which explain the sixth embodiment of the present invention, and an image-reading lens in Example 2. FIGS. 9 and 10 are diagrams which explain the seventh embodiment of the present invention, and an image-reading lens in Example 3.

Aberrations in those Examples 1 to 3 are sufficiently corrected. That is, by structuring an image-reading lens as any one of the image-reading lenses according to the fifth to seventh embodiments of the present invention, it is clear from those Examples 1 to 3 that an extremely favorable image performance can be ensured.

The following are meanings of common signs in Examples 1 to 3.

F: F-number
Y: object height
R: curvature radius
d: distance between surfaces
ne: refractive index of e-line
νe: Abbe number of e-line
ø: effective diameter of optical surface
K: conic constant of aspherical surface
$A_4$: fourth-order aspherical coefficient
$A_6$: sixth-order aspherical coefficient
$A_8$: eighth-order aspherical coefficient
$A_{10}$: tenth-order aspherical coefficient An aspherical shape used here is defined as X which is an aspherical amount in the optical axis direction by the following expression [6] where a reciprocal of a paraxial curvature radius (paraxial curvature) is C, the height from the optical axis is H, and a conic constant is K, by using each of the above aspherical coefficients, and a shape is determined by giving a paraxial curvature radius, a conic constant, and an aspherical coefficient.

$$X = \frac{CH^2}{1+\sqrt{\{1-(K+1)C^2H^2\}}} + A_4 \cdot H^4 + A_6 \cdot H^6 + A_8 \cdot H^8 + A_{10} \cdot H^{10} \quad (6)$$

FIG. 5 illustrates the fifth embodiment of the present invention and a structure of a longitudinal section of an optical system of an image-reading lens of Example 1.

The image-reading lens illustrated in FIG. 5 includes a first lens E1, a second lens E2, a third lens E3, a fourth lens E4, a fifth lens E5, a sixth lens E6, an aperture AD, a contact glass CTG, and a cover glass CVG.

In FIG. 5, as optical elements which constitute the optical system of the image-reading lens, from a side of a manuscript image as a photographic subject, that is, from an object side to an image side, the contact glass CTG, the first lens E1, the second lens E2, the aperture AD, the third lens E3, the fourth lens E4, the fifth lens E5, the sixth lens E6, and the cover glass CVG are arranged in order.

The contact glass CTG is generally a parallel plate glass as a manuscript placing glass, or the like, on a surface of which a manuscript image is closely contacted and arranged.

The first lens E1 is a positive lens which is constituted of a biconvex lens having a convex surface on the object side, a curvature of which is larger (that is, a surface having a smaller curvature radius) than that on the image side, and an aspherical surface is formed on the object side. The second lens E2 is a negative lens which is constituted of a biconcave lens having a concave surface on the image side, a curvature of which is larger than that on the object side. These two lenses of the first lens E1 and the second lens E2 are closely adhered with each other and integrally cemented, and are formed as a cemented lens where two lenses are cemented.

The aperture AD is interposed between the second lens E2 and the third lens E3.

The third lens E3 is a negative meniscus lens having a concave surface on the object side.

The fourth lens E4 is a positive lens which is constituted of a biconvex lens having a convex surface on the image side, a curvature of which is larger than that on the object side, and the fifth lens E5 is a negative meniscus lens having a concave surface on the object side.

These two lenses of the fourth lens E4 and the fifth lens E5 are closely adhered with each other and integrally cemented, and are formed as a cemented lens where two lenses are cemented.

The first lens E1, the second lens E2, the aperture AD, the third lens E3, the fourth lens E4, and the fifth lens E5 constitute a front-group lens system Gf.

The sixth lens E6 is a negative meniscus lens having a concave surface on the object side, both surfaces on the object side and image side are formed as aspherical surfaces, and the sixth lens E6 alone constitutes a rear-group lens system Gr.

The cover glass CVG is generally a parallel plate seal glass which protects an imaging plane of a solid-state image sensor such as a CCD (Charge-Coupled Device) image sensor or a CMOS (Complementary Metal-Oxide Semiconductor) image sensor which images an optical image of a manuscript image formed by the image-reading lens and obtains electronic image data, and in a case of using various optical filters such as an optical low-pass filter, an infrared cut filter, and the like, and a dummy glass instead of the cover glass, those are considered to fall within the cover glass CVG.

That is, a body of the image-reading lens is structured by the front-group lens system Gf constituted of the first lens E1, the second lens E2, the aperture AD, the third lens E3, the fourth lens E4, and the fifth lens E5 and the rear-group lens system Gr constituted of the sixth lens E6, and an optical image of a manuscript image as an imaging object, which is closely contacted and placed on the contact glass CVG, is formed behind the cover glass CVG.

In FIG. 5, surface numbers of the optical surfaces are also illustrated. Each reference sign in FIG. 5 is commonly used for corresponding parts in Examples 1 to 3, in order to avoid complication of explanations by an increase in the number of digits of the reference signs, and therefore, if common reference signs are used in FIGS. 7 and 9, Example 2 and Example 3 corresponding to those do not necessarily have the same structures.

In Example 1, an F-number F=F5.00, an angle of view (total angle of view) ω=59.07°, and an object height Y=152.4, and optical characteristics of each optical element are shown in the following table. Note that in the following Table 1, the contact glass is denoted by CTG, the aperture is denoted by AD, the cover glass is denoted by CVG, the front-group lens system is denoted by Gf, the rear-group lens system is denoted by Gr, the first lens is denoted by E1, the second lens is denoted by E2, the third lens is denoted by E3, the fourth lens is denoted by E4, the fifth lens is denoted by E5, and the sixth lens is denoted by E6, and BF denotes a back focal length.

TABLE 1

OPTICAL CHARACTERISTICS

| SURFACE NUMBER | r | d | ne | ve | φ | REMARKS | |
|---|---|---|---|---|---|---|---|
| 1 | ∞ | 3.20 | 1.51825 | 63.93 | | CTG | |
| 2 | ∞ | 0.10 | | | | | |
| 3* | 14.340 | 2.07 | 1.69661 | 52.93 | 8.76 | E1 | Gf |
| 4 | −49.035 | 1.79 | 1.59910 | 38.97 | 7.68 | E2 | |
| 5 | 11.688 | 0.98 | | | 5.60 | | |
| 6 | ∞ | 1.51 | | | 4.75 | AD | |
| 7 | −41.590 | 1.22 | 1.65222 | 33.53 | 6.62 | E3 | |
| 8 | −450.000 | 0.20 | | | 7.68 | | |
| 9 | 30.778 | 3.50 | 1.59732 | 67.37 | 8.42 | E4 | |
| 10 | −7.117 | 1.29 | 1.51825 | 63.93 | 9.40 | E5 | |
| 11 | −17.457 | 15.45 | | | 10.74 | | |
| 12* | −11.257 | 4.49 | 1.53342 | 56.15 | 17.68 | E6 | Gr |
| 13* | −77.089 | 1.00 | | | 25.36 | | |
| 14 | ∞ | 0.70 | 1.51825 | 63.93 | | CVG | |
| 15 | ∞ | BF | | | | | |

In Table 1, a lens surface of a surface number to which an asterisk "*" is added is an aspherical surface. That is, in Table 1, each optical surface of a third surface, a 12th surface, a 13th surface to which an asterisk "*" is added is an aspherical surface, and parameters of each aspherical surface in the expression [6] are shown in the following Table 2. Note that as to aspherical coefficients, "En" expresses "exponential in decimal", that is, "×10$^n$", and for example, "E-05" expresses "×10$^{-5}$". These are applied to other Examples.

TABLE 2

PARAMETERS OF ASPHERICAL SURFACES

| SURFACE NUMBER | K | $A_4$ | $A_6$ | $A_8$ | $A_{10}$ |
|---|---|---|---|---|---|
| 3 | 0 | −7.58232E−05 | −8.10914E−07 | −1.26258E−08 | 7.49968E−11 |
| 12 | 0 | −1.02389E−04 | 6.47512E−07 | 1.44989E−09 | −2.88058E−11 |
| 13 | 0 | −1.28623E−04 | 7.45131E−07 | −2.50969E−09 | 3.23548E−12 |

In this case, values corresponding to the conditional expressions [1] to [5] are shown in the following Table 3, and satisfy the conditional expressions [1] to [5], respectively.

TABLE 3

VALUES OF CONDITIONAL EXPRESSIONS

| CONDITIONAL EXPRESSION | VARIABLE | VALUE |
|---|---|---|
| [1] | fr/f | −0.94 |
| [2] | (Rc + Rb)/(Rc − Rb) | 1.34 |
| [3] | Ra/Rb | 1.55 |
| [4] | ds/D | 0.48 |
| [5] | (φb − φa)/2ds | 0.22 |

Additionally, in FIG. 6, diagrams of spherical aberration, astigmatism, distortion, and comatic aberration in Example 1 are illustrated. Note that in those aberration diagrams, a broken line in the diagram of spherical aberration expresses a sine condition, and a solid line and a broken line in the diagram of astigmatism express a sagittal ray and a meriodinal ray, respectively. In addition, "e", "g", "C", and "F" express an e-line, a g-line, a C-line, and an F-line, respectively.

EXAMPLE 2

Sixth Embodiment

FIG. 7 illustrates the sixth embodiment of the present invention and a structure of a longitudinal section of an optical system of an image-reading lens of Example 2.

The image-reading lens illustrated in FIG. 7 includes a first lens E1, a second lens E2, a third lens E3, a fourth lens E4, a fifth lens E5, a sixth lens E6, an aperture AD, a contact glass CTG, and a cover glass CVG.

In FIG. 7, as optical elements which constitute the optical system of the image-reading lens, from a side of a manuscript image as a photographic subject, that is, from an object side to an image side, the contact glass CTG, the first lens E1, the second lens E2, the aperture AD, the third lens E3, the fourth lens E4, the fifth lens E5, the sixth lens E6, and the cover glass CVG are arranged in order.

The contact glass CTG is generally a transparent parallel plate glass as a manuscript placing glass, or the like, on a surface of which a manuscript image is closely contacted and arranged.

The first lens E1 is a positive lens which is constituted of a biconvex lens having a convex surface on the object side, a curvature of which is larger than that on the image side, and an aspherical surface is formed on the object side. The second lens E2 is a negative lens which is constituted of a biconcave lens having a concave surface on the image side, a curvature of which is larger than that on the object side. These two lenses of the first lens E1 and the second lens E2 are closely adhered with each other and integrally cemented, and are formed as a cemented lens where two lenses are cemented.

The aperture AD is interposed between the second lens E2 and the third lens E3.

The third lens E3 is a negative lens which is constituted of a biconcave lens having a concave surface on the image side, a curvature of which is larger than that on the object side.

The fourth lens E4 is a positive lens which is constituted of a biconvex lens having a convex surface on the image side, a curvature of which is larger than that on the object side, and the fifth lens E5 is a negative meniscus lens having a concave surface on the object side.

These two lenses of the fourth lens E4 and the fifth lens E5 are closely adhered with each other and integrally cemented, and are formed as a cemented lens where two lenses are cemented.

The first lens E1, the second lens E2, the aperture AD, the third lens E3, the fourth lens E4, and the fifth lens E5 constitute a front-group lens system Gf.

The sixth lens E6 is a negative meniscus lens having a concave surface on the object side, both surfaces on the object side and image side are formed as aspherical surfaces, and the sixth lens E6 alone constitutes a rear-group lens system Gr.

The cover glass CVG is generally a parallel plate seal glass which protects an imaging plane of a solid-state image sensor such as a CCD image sensor or a CMOS image sensor which images an optical image of a manuscript image formed by the image-reading lens and obtains electronic image data, and in a case of using various optical filters such as an optical low-pass filter, an infrared cut filter, and the like, and a dummy glass instead of the cover glass, those are considered to fall within the cover glass CVG.

That is, a body of the image-reading lens is structured by the front-group lens system Gf constituted of the first lens E1, the second lens E2, the aperture AD, the third lens E3, the fourth lens E4, and the fifth lens E5 and the rear-group lens system Gr constituted of the sixth lens E6, and an optical image of a manuscript image as an imaging object, which is closely contacted and placed on the contact glass CVG, is formed behind the cover glass CVG.

In Example 2, an F-number F=F5.00, an angle of view (total angle of view) ω=59.15°, and an object height Y=152.4, and optical characteristics of each optical element are shown in the following Table 4. Note that in the following Table 4, the contact glass is denoted by CTG, the aperture is denoted by AD, the cover glass is denoted by CVG, the front-group lens system is denoted by Gf, the rear-group lens system is denoted by Gr, the first lens is denoted by E1, the second lens is denoted by E2, the third lens is denoted by E3, the fourth lens is denoted by E4, the fifth lens is denoted by E5, and the sixth lens is denoted by E6, and BF denotes a back focal length.

TABLE 4

OPTICAL CHARACTERISTICS

| SURFACE NUMBER | r | d | ne | ve | φ | REMARKS | |
|---|---|---|---|---|---|---|---|
| 1 | ∞ | 3.20 | 1.51825 | 63.93 | | CTG | |
| 2 | ∞ | 0.10 | | | | | |
| 3* | 16.254 | 1.93 | 1.68084 | 54.64 | 8.44 | E1 | Gf |
| 4 | −46.920 | 1.20 | 1.59910 | 38.97 | 7.42 | E2 | |
| 5 | 15.945 | 1.14 | | | 6.02 | | |
| 6 | ∞ | 1.40 | | | 4.91 | AD | |
| 7 | −200.858 | 1.20 | 1.65222 | 33.53 | 6.62 | E3 | |
| 8 | 57.351 | 0.52 | | | 7.52 | | |
| 9 | 23.790 | 3.28 | 1.59732 | 67.37 | 8.60 | E4 | |
| 10 | −8.472 | 4.13 | 1.51045 | 60.98 | 9.46 | E5 | |
| 11 | −18.286 | 11.30 | | | 11.90 | | |
| 12* | −10.124 | 4.50 | 1.53342 | 56.15 | 15.62 | E6 | Gr |
| 13* | −229.136 | 1.00 | | | 23.50 | | |
| 14 | ∞ | 0.70 | 1.51825 | 63.93 | | CVG | |
| 15 | ∞ | BF | | | | | |

Also in Table 4, a lens surface of a surface number to which an asterisk "*" is added is an aspherical surface. That is, in Table 4, each optical surface of a third surface, a 12th surface, a 13th surface to which an asterisk "*" is added is an aspherical surface, and parameters of each aspherical surface in the expression [6] are shown in the following Table 5.

TABLE 5

PARAMETERS OF ASPHERICAL SURFACES

| SURFACE NUMBER | K | $A_4$ | $A_6$ | $A_8$ | $A_{10}$ |
|---|---|---|---|---|---|
| 3 | 0 | −7.01569E−05 | −6.60638E−07 | −6.94254E−09 | 1.17337E−11 |
| 12 | 0 | −1.90430E−04 | 4.85524E−07 | 1.42003E−08 | −1.93143E−10 |
| 13 | 0 | −1.67438E−04 | 1.13952E−06 | −4.53770E−09 | 7.39001E−12 |

In this case, values corresponding to the conditional expressions [1] to [5] are shown in the following Table 6, and satisfy the conditional expressions [1] to [5], respectively.

TABLE 6

VALUES OF CONDITIONAL EXPRESSIONS

| CONDITIONAL EXPRESSION | VARIABLE | VALUE |
|---|---|---|
| [1] | fr/f | −0.75 |
| [2] | (Rc + Rb)/(Rc − Rb) | 1.09 |
| [3] | Ra/Rb | 1.81 |
| [4] | ds/D | 0.37 |
| [5] | (φb − φa)/2ds | 0.16 |

Additionally, in FIG. 8, diagrams of spherical aberration, astigmatism, distortion, and comatic aberration in Example 2 are illustrated. Note that in those aberration diagrams, a broken line in the diagram of spherical aberration expresses a sine condition, and a solid line and a broken line in the diagram of astigmatism express a sagittal ray and a meriodinal ray, respectively. In addition, "e", "g", "C", and "F" express an e-line, a g-line, a C-line, and an F-line, respectively.

EXAMPLE 3

Seventh Embodiment

FIG. 9 illustrates the seventh embodiment of the present invention and a structure of a longitudinal section of an optical system of an image-reading lens of Example 3.

The image-reading lens illustrated in FIG. 9 includes a first lens E1, a second lens E2, a third lens E3, a fourth lens E4, a fifth lens E5, a sixth lens E6, an aperture AD, a contact glass CTG, and a cover glass CVG.

In FIG. 9, as optical elements which constitute the optical system of the image-reading lens, from a side of a manuscript image as a photographic subject, that is, from an object side to an image side, the contact glass CTG, the first lens E1, the second lens E2, the aperture AD, the third lens E3, the fourth lens E4, the fifth lens E5, the sixth lens E6, and the cover glass CVG are arranged in order.

The contact glass CTG is generally a parallel plate glass as a manuscript placing glass, or the like, on a surface of which a manuscript image is closely contacted and arranged.

The first lens E1 is a negative meniscus having a concave surface on the image side, and an aspherical surface is formed on the object side. The second lens E2 is a positive meniscus lens having a concave surface on the image side. These two lenses of the first lens E1 and the second lens E2 are closely adhered with each other and integrally cemented, and are formed as a cemented lens where two lenses are cemented.

The aperture AD is interposed between the second lens E2 and the third lens E3.

The third lens E3 is a negative lens which is constituted of a biconcave lens having a concave surface on the image side, a curvature of which is larger than that on the object side. The fourth lens E4 is a positive lens which is constituted of a biconvex lens having a convex surface on the object side, a curvature of which is larger than that on the image side, and the fifth lens E5 is a positive meniscus lens having a concave surface on the object side.

These three lenses of the third lens E3, the fourth lens E4 and the fifth lens E5 are closely adhered with each other and integrally cemented, and are formed as a cemented lens where three lenses are cemented.

The first lens E1, the second lens E2, the aperture AD, the third lens E3, the fourth lens E4, and the fifth lens E5 constitute a front-group lens system Gf.

The sixth lens E6 is a negative meniscus lens having a concave surface on the object side, both surfaces on the object side and image side are formed as aspherical surfaces, and the sixth lens E6 alone constitutes a rear-group lens system Gr.

The structure of the image-reading lens of Example 3 according to the seventh embodiment is different from those of Example 1 and Example 2 in that the third lens E3 and the fourth lens E4 are cemented.

The cover glass CVG is generally a parallel plate seal glass which protects an imaging plane of a solid-state image sensor such as a CCD image sensor or a CMOS image sensor which images an optical image of a manuscript image formed by the image-reading lens and obtains electronic image data, and in a case of using various optical filters such as an optical low-pass filter, an infrared cut filter, and the like, and a dummy glass instead of the cover glass, those are considered to fall within the cover glass CVG.

That is, a body of the image-reading lens is structured by the front-group lens system Gf constituted of the first lens E1, the second lens E2, the aperture AD, the third lens E3, the fourth lens E4, and the fifth lens E5, and the rear-group lens system Gr constituted of the sixth lens E6, and an optical image of a manuscript image as an imaging object, which is closely contacted and placed on the contact glass CVG, is formed behind the cover glass CVG.

In Example 3, an F-number F=F5.00, an angle of view (total angle of view) ω=59.64°, and an object height Y=152.4, and optical characteristics of each optical element are shown in the following Table 7. Note that in the following Table 7, the contact glass is denoted by CTG, the aperture is denoted by AD, the cover glass is denoted by CVG, the front-group lens system is denoted by Gf, the rear-group lens system is denoted by Gr, the first lens is denoted by E1, the second lens is denoted by E2, the third lens is denoted by E3, the fourth lens is denoted by E4, the fifth lens is denoted by E5, and the sixth lens is denoted by E6, and BF denotes a back focal length.

TABLE 7

OPTICAL CHARACTERISTICS

| SURFACE NUMBER | r | d | ne | ve | φ | REMARKS | |
|---|---|---|---|---|---|---|---|
| 1 | ∞ | 3.20 | 1.51825 | 63.93 | | CTG | |
| 2 | ∞ | 0.10 | | | | | |
| 3* | 12.127 | 1.20 | 1.69661 | 52.93 | 11.72 | E1 | Gf |
| 4 | 6.353 | 5.50 | 1.59732 | 67.37 | 9.70 | E2 | |
| 5 | 64.108 | 1.29 | | | 6.38 | | |
| 6 | ∞ | 1.37 | | | 4.11 | AD | |
| 7 | −64.068 | 1.90 | 1.81264 | 25.22 | 5.84 | E3 | |
| 8 | 11.156 | 5.50 | 1.85649 | 32.03 | 7.60 | E4 | |
| 9 | −29.810 | 2.50 | 1.59732 | 67.37 | 10.36 | E5 | |
| 10 | −20.223 | 7.01 | | | 11.78 | | |
| 11* | −8.592 | 4.50 | 1.53342 | 56.15 | 14.32 | E6 | Gr |
| 12* | −338.812 | 1.00 | | | 22.96 | | |
| 13 | ∞ | 0.70 | 1.51825 | 63.93 | | CVG | |
| 14 | ∞ | BF | | | | | |

Also in Table 7, a lens surface of a surface number to which an asterisk "*" is added is an aspherical surface. That is, in Table 7, each optical surface of a third surface, an 11th surface, a 12th surface to which an asterisk "*" is added is an aspherical surface, and parameters of each aspherical surface in the expression [6] are shown in the following Table 8.

TABLE 8

PARAMETERS OF ASPHERICAL SURFACES

| SURFACE NUMBER | K | $A_4$ | $A_6$ | $A_8$ | $A_{10}$ |
|---|---|---|---|---|---|
| 3 | 0 | −1.27794E−05 | 6.65485E−08 | −3.84373E−09 | 2.94354E−11 |
| 11 | 0 | −2.64703E−04 | −4.56728E−07 | 8.50174E−08 | −1.09052E−09 |
| 12 | 0 | −2.88725E−04 | 1.97513E−06 | −8.81619E−09 | 1.29524E−11 |

In this case, values corresponding to the conditional expressions [1] to [5] are shown in the following Table 9, and satisfy the conditional expressions [1] to [5], respectively.

TABLE 9

VALUES OF CONDITIONAL EXPRESSIONS

| CONDITIONAL EXPRESSION | VARIABLE | VALUE |
|---|---|---|
| [1] | fr/f | −0.63 |
| [2] | (Rc + Rb)/(Rc − Rb) | 1.05 |
| [3] | Ra/Rb | 2.35 |
| [4] | ds/D | 0.23 |
| [5] | (φb − φa)/2ds | 0.18 |

Additionally, in FIG. 10, diagrams of spherical aberration, astigmatism, distortion, and comatic aberration in Example 3 are illustrated. Note that in those aberration diagrams, a broken line in the diagram of spherical aberration expresses a sine condition, and a solid line and a broken line in the diagram of astigmatism express a sagittal ray and a meriodinal ray, respectively. In addition, "e", "g", "C", and "F" express an e-line, a g-line, a C-line, and an F-line, respectively.

Eighth Embodiment

Next, an image-reading device according to an eighth embodiment of the present invention which is structured by employing an image-reading lens such as that of Example 1 according to the fifth embodiment, that of Example 2 according to the sixth embodiment, that of Example 3 according to the seventh embodiment, or the like as an image-forming lens for image reading will be explained.

Figure 11:
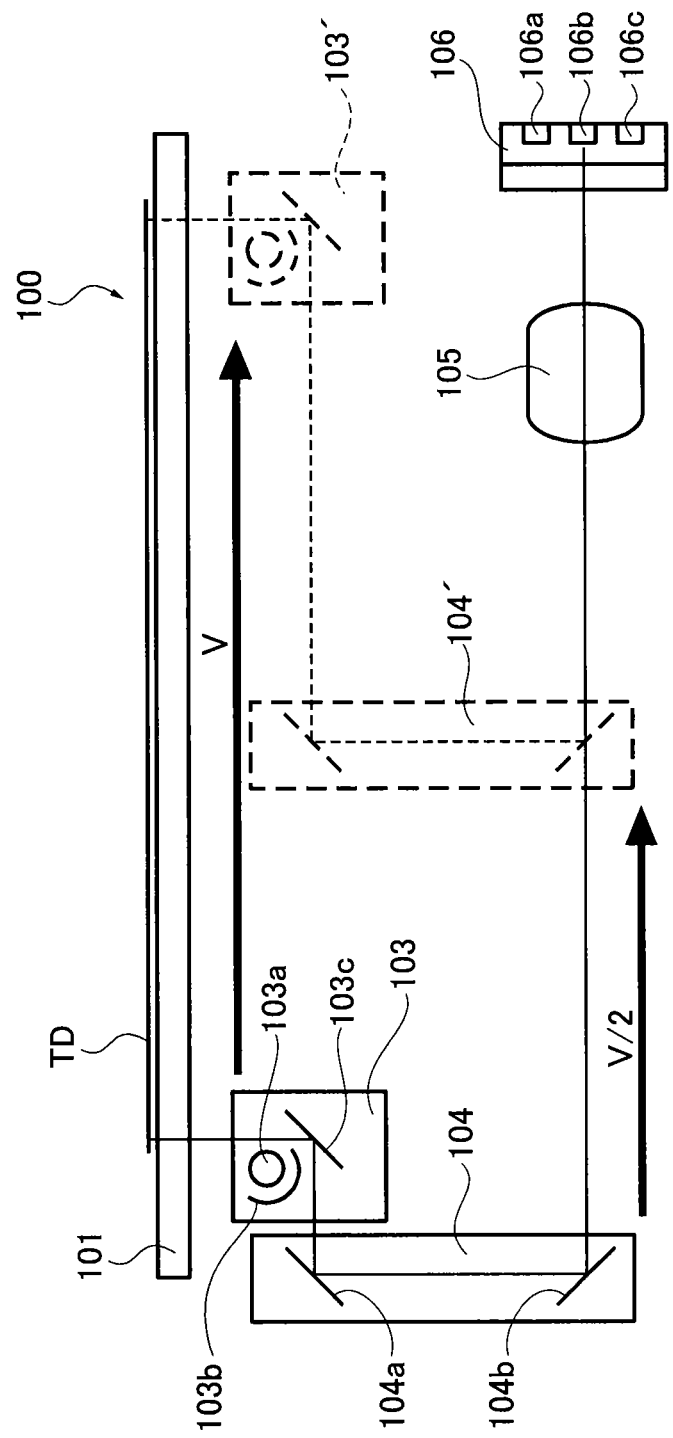
FIG. 11 is a cross-sectional diagram illustrating a conceptual structure of a main part of an image-reading device according to an eighth embodiment of the present invention.
Figure 12:
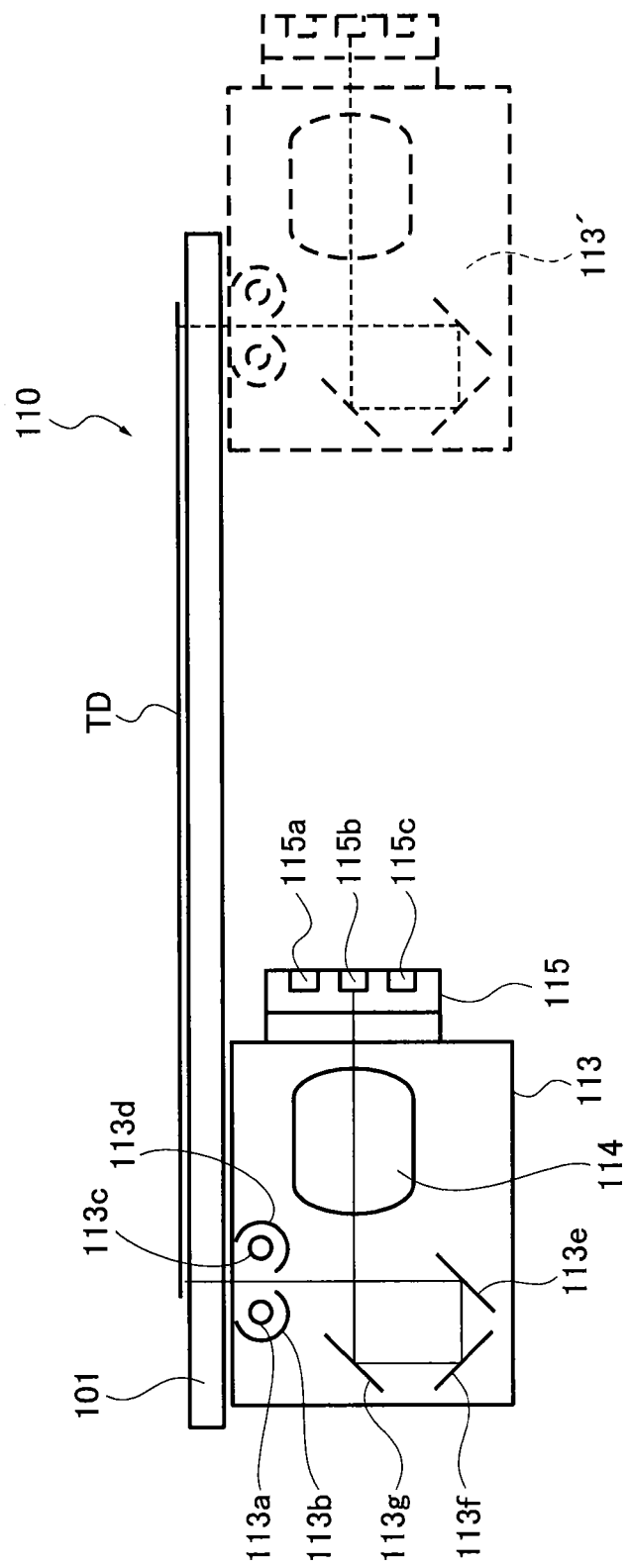
FIG. 12 is a cross-sectional diagram illustrating a conceptual structure of a main part of an image-reading device according to a ninth embodiment of the present invention.

In the eighth embodiment and a ninth embodiment, an image-reading lens such as that of Example 1 according to the fifth embodiment, that of Example 2 according to the sixth embodiment, or that of Example 3 according to the seventh embodiment is employed as an image-forming lens for image reading. FIG. 11 is a diagram that explains an image-reading device according to the eighth embodiment of the present invention, and FIG. 12 is a diagram that explains an image-reading device according to the ninth embodiment of the present invention.

FIG. 11 schematically illustrates a conceptual structure of a longitudinal section of an image-reading device according to the eighth embodiment of the present invention. In the image-reading device according to the eighth embodiment, any one of the image-reading lens of the above-described Example 1, the image-reading lens of the above-described Example 2, and the image-reading lens of the above-described Example 3 is used as an image-forming lens for image reading.

The image-reading device illustrated in FIG. 11 includes a contact glass 101, a first carrier 103, a second carrier 104, an image-reading lens 105, and a line sensor 106. The first carrier 103 includes an illumination light source 103a, a light source mirror 103b, and a first mirror 103c. The second carrier 104 includes a second mirror 104a, and a third mirror 104b. The line sensor 106 includes photoelectrical conversion elements 106a, 106b, and 106c which include red (R), green (G), and blue (B) filters as color separators and constitute a 3-line CCD sensor by arranging the photoelectrical conversion elements in three lines in one chip. Here, for example, the image-reading lens 105 is structured by using any one of the image-reading lenses according to the above-described first to third embodiments.

In FIG. 11, a manuscript TD as an object to be read on which an image to be read is described is placed in a planar manner in a state where a surface to be read is turned down on the contact glass 101 which is a flat manuscript placing glass as a manuscript table. The first carrier 103 placed below the contact glass 101 holds the illumination light source 103a, the light source mirror 103b, and the first mirror 103c which are all long in a direction perpendicular to a drawing in FIG. 11, and the first carrier 103 travels in a uniform travelling speed V from a position shown as the first carrier 103 to a position shown as a first carrier 103' in FIG. 11.

The illumination light source 103a is an elongate light source in the direction perpendicular to the drawing in FIG. 11 which is a longitudinal direction. As the illumination light source 103a, a halogen lamp, a Xe (so-called xenon) lamp, or a tube lamp such as a fluorescent lamp of a cold-cathode tube, or the like may be used, an illumination light source in which point light sources such as LEDs (Light-Emitting Diodes) are aligned, or a linear light source using an optical guiding device which converts a point light source to a linear light source may be used, or an illumination light source in which a surface-emitting light source as represented by an organic EL (electroluminescence) is formed in an elongated shape may be used. The illumination light source 103a is controlled to emit light when the first carrier 103 travels and displaces in the right direction in FIG. 11. Light emitted from the illumination light source 103a is guided by the light source mirror 103b which is long semi-tubular in the direction perpendicular to the drawing in FIG. 11, and illuminates a slit-like portion which is long in a main-scanning direction perpendicular to the drawing in FIG. 11 in the manuscript placed on the contact glass 101.

The first mirror 103c is held by the first carrier 103 in a state where a mirror surface is inclined at 45 degrees to the manuscript placing surface of the contact glass 101.

The second carrier 104 holds the paired second mirror 104a and third mirror 104b which are long in the direction perpendicular to the drawing in FIG. 11 and mirror surfaces of which are inclined perpendicularly to each other. The second carrier 104 displaces at a uniform travelling speed V/2 (that is, half of the speed of the first carrier 103) to a position shown as a second carrier 104' in synchronization with displacement of the first carrier 103.

Reflected light from a portion illuminated in the manuscript TD (light reflected by an image) is reflected by the first mirror 103c provided in the first carrier 103, and then reflected by the second mirror 104a and the third mirror 104b provided in the second carrier 104 in order, incident to the image-reading lens 105, and by the image-reading lens 105, a reduced optical image of the manuscript image is formed on an imaging plane (input plane) of the line sensor 106 via a cover glass of the line sensor 106 as an image sensor.

That is, the first mirror 103c, the second mirror 104a, and the third mirror 104b constitute a reflecting optical system. By a not-illustrated driver, the first carrier 103 and the second carrier 104 travel in the directions of arrows (right direction in the drawing), respectively. At this time, if a travelling speed of the first carrier 103 is V, a travelling speed of the second carrier 104 is V/2, and while the first carrier 103 travels a predetermined amount, the second carrier 104 travels only half of the travel amount of the first carrier 103.

By travelling as above, the first carrier 103 and the second carrier 104 displaces to positions illustrated by broken lines, respectively. The illumination light source 103a, the light source mirror 103b, and the first mirror 103c travel integrally with the first carrier 103, and illuminate and scan the entire manuscript TD on the contact glass 101. As described above, a ratio of the travelling speed of the first carrier 103 to that of the second carrier 104 is V:V/2=2:1, and therefore, an optical path length from a portion in the manuscript illuminated and scanned to the image-reading lens 105 keeps approximately unchanged.

The line sensor 106 as the image sensor is a 3-line CCD sensor in which photoelectrical conversion elements 106a, 106b, and 106c including red (R), green (G), and blue (B) filters as color separators are arranged in three lines in one chip. The line sensor 106 converts the manuscript image to an image signal along with illuminating and scanning the manuscript TD. Thus, reading of the manuscript TD is performed, and a color image of the manuscript TD is separated into three primary colors of red, green and blue, and read.

Such an image-reading device 100 is a device which reads an image in full-color, and includes a color separator including the red (R), green (G), and blue (B) filters provided in the line sensor 106 in an image-forming optical path of the image-reading lens 105.

As described above, an image-forming luminous flux incident to the image-reading lens 105 forms a reduced image of the manuscript TD on a light-receiving surface of the line sensor 106 as the image sensor by an image-forming function of the image-reading lens 105. In this case, the line sensor 106 is a CCD line sensor in which minute photoelectrical convertors are closely arranged in the direction perpendicular to the drawing in FIG. 11, and along with illuminating and scanning of the manuscript TD, converts the manuscript image to an electrical signal per pixel, and outputs it. As described above, the line sensor 106 reads a color manuscript by separating the formed image into three colors (red, green, and blue), reading color information, and combining electrical signals converted by photoelectrical convertors of each color.

The electrical signals are converted to image signals through a signal processing of A/D (analog to digital) conversion, and the like, and stored on a memory (not-illustrated) as needed.

Thus, by using any one of the image-reading lenses according to the first to third embodiments of the present invention as the image-reading lens 105 illustrated in FIG. 11, it is possible to miniaturize an image-reading device.

Additionally, a method of color separation is not only limited to the above structure, but also a structure in which a color-separating prism or a filter is selectively inserted between an image-reading lens and a line sensor, and a manuscript image is separated into red (R), green (G), and blue (B), or a structure in which red (R), green (G), and blue (B) light sources are lit in order, and a manuscript is illuminated can be used.

That is, the image-reading device according to the eighth embodiment of the present invention is an image-reading device using an image-reading lens of a combination of any one of the above first to fourth embodiments and any one of the above fifth to seventh embodiments as an image-forming lens. The image-reading lens may include a color separation function in an image-forming optical path by an image-forming lens, and read manuscript information in full-color.

Ninth Embodiment

Note that an image-reading device can be adopted such that an illumination device which illuminates a manuscript on a contact glass in a slit-like manner, a line sensor, a plurality of mirrors which form an image-forming optical path from a portion illuminated in the manuscript to the line sensor, and an image-reading lens which is arranged on the image-forming optical path are integrally structured as an image-reading unit, and the manuscript is read and scanned by travelling the image-reading unit relatively to the manuscript by a driver. This is the structure of the image-reading device according the ninth embodiment of the present invention.

The image-reading device according to the ninth embodiment of the present invention structured by employing any one of the image-reading lenses according to the above fifth to seventh embodiments of the present invention as an image-forming lens for image reading will be explained with reference to FIG. 12.

FIG. 12 schematically illustrates a conceptual structure of a longitudinal section of an image-reading device according to the ninth embodiment of the present invention. Also in the image-reading device according to the ninth embodiment, any one of the image-reading lenses according to the above fifth to seventh embodiments of the present invention is used as an image-forming lens for image reading.

An image-reading device 110 illustrated in FIG. 12 includes a contact glass 101, an image-reading unit 113, an image-reading lens 114, and a line sensor 115.

The image-reading unit 113 includes a first illumination light source 113a, a first light source mirror 113b, a second illumination light source 113c, a second light source mirror 113d, a first mirror 113e, a second mirror 113f, and third mirror 113g. The line sensor 115 includes photoelectrical conversion elements 115a, 115b, and 115c which include red (R), green (G), and blue (B) filters as color separators and constitute a 3-line CCD sensor by arranging the photoelectrical conversion elements in three lines in one chip. Here, for example, the image-reading lens 114 is structured by using the image-reading lens according to the above-described first embodiment.

That is, the image-reading device according to the ninth-embodiment of the present invention is an image-reading device using an image-reading lens of a combination of any one of the above first to fourth embodiments and any one of the above fifth to seventh embodiments as an image-forming lens.

In FIG. 12, a manuscript TD as an object to be read in which an image to be read is included is placed in a planar manner in a state where a surface to be read is turned down on the contact glass 101 which is a flat manuscript placing glass as a manuscript table. The image-reading unit 113 placed below the contact glass 101 holds the first illumination light source 113a, the first light source mirror 113b, the second illumination light source 113c, the second light source mirror 113d, the first mirror 113e, the second mirror 113f, and the third mirror 113g which are all long in a direction perpendicular to a drawing in FIG. 12, and the image-reading unit 113 is also integrally provided with the image-reading lens 114 and the line sensor 115.

Each of the first illumination light source 113a and the second illumination light source 113c is an elongated light source in the direction perpendicular to the drawing in FIG. 12 as a longitudinal direction. Like the illumination light source 103a in FIG. 11, in the first illumination light source 113a and the second illumination light source 113c, a halogen lamp, a Xe (so-called xenon) lamp, or a tube lamp such as a fluorescent lamp of a cold-cathode tube, or the like may be used, an illumination light source in which point light sources such as LEDs (Light-Emitting Diodes) are aligned, or a linear light source using an optical guiding device which converts a point light source to a linear light source may be used, or an illumination light source in which a surface-emitting light source as represented by an organic EL (electroluminescence) is formed in an elongated shape can be used. The first illumination light source 113a and the second illumination light source 113c are controlled to emit light when the image-reading unit 113 travels and displaces in the right direction in FIG. 12. Light emitted from the first illumination light source 113a and the second illumination light source 113c is guided by the first light source mirror 113b and the second light source mirror 113d which are long semi-tubular in the direction perpendicular to the drawing in FIG. 12, and illuminates a slit-like portion which is long in a main-scanning direction perpendicular to the drawing in FIG. 12 in the manuscript placed on the contact glass 101.

The first mirror 113e, the second mirror 113f, and the third mirror 113g are all long in the direction perpendicular to the drawing in FIG. 12, and held by the image-reading unit 113 in a state where mirror surfaces are inclined at 45 degrees to the manuscript placing surface of the contact glass 101, and the mirror surfaces are inclined perpendicularly to each other.

While the image-reading unit 113 travels from a position of the image-reading unit 113 to a position illustrated as an image-reading unit 113' illustrated in FIG. 12 at a uniform speed, reflected light from a portion illuminated in the manuscript TD (light reflected by an image) is reflected by the first mirror 113e provided in the image-reading unit 113, and then reflected by the second mirror 113f provided in the image-reading unit 113 and the third mirror 113g provided in the image-reading unit 113 in order, incident to the image-reading lens 114, and by the image-reading lens 114, a reduced optical image of the manuscript image is formed on an imaging plane (input plane) of the line sensor 115 via a cover glass of the line sensor 115 as an image sensor.

That is, the first mirror 113e, the second mirror 113f, and the third mirror 113g constitute a reflecting optical system. By a not-illustrated driver, the image-reading unit 113 travels in the right direction illustrated in FIG. 12.

Therefore, while the image-reading unit 113 displaces to the position illustrated as the image-reading unit 113', the manuscript TD is illuminated and scanned. When the manuscript is illuminated and scanned, reflected light from the manuscript TD of illumination light is reflected by the first mirror 113e, the second mirror 113f, and the third mirror 113g in order, and incident to the image-reading lens 114 as an image-forming luminous flux.

At this time, all of the first mirror 113e, the second mirror 113f, and the third mirror 113g are integrally held by the image-reading unit 113, and therefore, an optical path length from a portion illuminated in the manuscript TD to the image-reading lens 114 while the manuscript TD is illuminated and scanned is uniform.

The image-forming luminous flux incident to the image-reading lens 114 forms a reduced image of an image of the manuscript TD on a light-receiving surface of the line sensor 115 as the image sensor, by an image-forming function of the image-reading lens 114. The image formed on the light-receiving surface of the line sensor 115 is converted to an electrical signal, and manuscript information is read as in a case of the above image-reading device according to the eighth embodiment.

Tenth Embodiment

In a tenth embodiment of the present invention, an image-forming apparatus is structured by using the image-reading device according to the eighth embodiment or the image-reading device according to the ninth embodiment of the present invention. Such an image-forming apparatus according to the tenth embodiment of the present invention will be explained.

Figure 13:
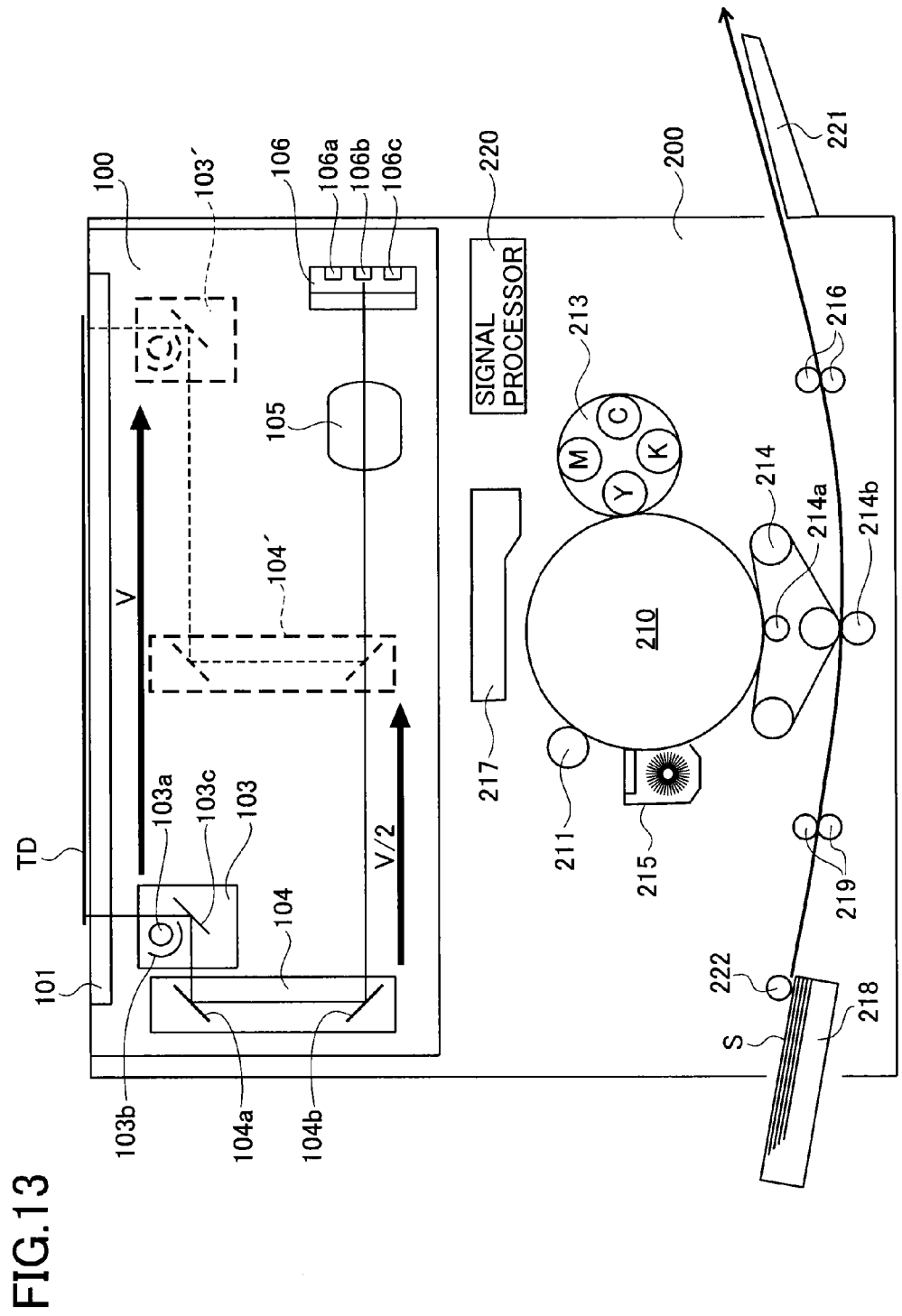
FIG. 13 is a cross-sectional diagram illustrating a conceptual structure of a main part of an image-forming apparatus according to a tenth embodiment of the present invention.

FIG. 13 is a diagram that explains the image-forming apparatus according to the tenth embodiment of the present invention.

FIG. 13 schematically illustrates a conceptual structure of a longitudinal section of the image-forming apparatus according to the tenth embodiment of the present invention. In this image-forming apparatus, the image-reading device illustrated in FIG. 11 according to the above-described eighth embodiment is used for image reading.

The image-forming apparatus illustrated in FIG. 13 includes an image-reading device 100, and an image-forming device 200. Since the image-reading device 100 has a structure similar to that in FIG. 11, portions similar to those in FIG. 11 are denoted by the same reference signs as those in FIG. 11, and detailed explanations are omitted. That is, the image-reading device 100 includes a contact glass 101, a first carrier 103, a second carrier 104, an image-reading lens 105, and a line sensor 106. The first carrier 103 includes an illumination light source 103a, a light source mirror 103b, and a first mirror 103c. The second carrier 104 includes a second mirror 104a, and a third mirror 104b. The line sensor 106 includes photoelectrical conversion elements 106a, 106b, and 106c which include red (R), green (G), and blue (B) filters as color separators and constitute a 3-line CCD sensor by arranging the photoelectrical conversion elements in three lines in one chip. The image-reading lens 105 is structured by using any one of the image-reading lenses according to the fifth to seventh embodiment.

Note that an image-reading device in which an illumination device which illuminates a manuscript on a contact glass in a slit-like manner, a line sensor, a plurality of mirrors which form an image-forming optical path from a portion illuminated in the manuscript to the line sensor, and an image-forming lens which is arranged on the image-forming optical path are integrally structured as an image-reading unit, and the manuscript is read and scanned by travelling the image-reading unit relatively to the manuscript by a driver can be used as an image-reading device. That is, in place of the image-reading device illustrated in FIG. 11 according to the eighth embodiment, an image-forming apparatus may be structured by using the image-reading device illustrated in FIG. 12 according to the ninth embodiment of the present invention.

Additionally, the image-forming device 200 is located below the image-reading device 100, and includes a photoreceptor 210, a charging roller 211, a developing device 213, a transfer belt part 214, a cleaning device 215, a fixing device 216, an optical scanning device 217, a cassette 218, a pair of registration rollers 219, a signal processor 220, a tray 221, and a paper feeding roller 222. The transfer belt part 214 includes a transfer voltage-applying roller 214a, and a transfer roller 214b.

In FIG. 13, an image signal outputted from the line sensor 106 as the 3-line CCD sensor of the image-reading device 100 is sent to the signal processor 220 of the image-forming device 200, processed to a signal for writing, that is, converted to a signal for writing each of colors of yellow (Y), magenta (M), cyan (C), and black (K) in the signal processor 220.

The image-forming device 200 has the photoreceptor 210 which is photoconductive and formed in a circular-cylindrical shape as a latent image carrier, and the charging roller 211 as a charger, the developing device 213 which is a turret-type, the transfer belt part 214, and the cleaning device 215 are placed therearound. As the charger, a corona charger can be used in place of the charging roller 211.

The optical scanning device 217 receives a signal for writing from the signal processor 220, and performs writing on the photoreceptor 210 by optical scanning. Additionally, the optical scanning device 217 performs optical scanning on the photoreceptor 210 between the charging roller 211 and the developing device 213.

When performing image-forming, the photoconductive photoreceptor 210 is rotated at constant speed in a clockwise manner, a surface thereof is uniformly charged by the charging roller 211, and an electrostatic latent image is formed by receiving exposure by optical writing of a laser beam of the optical scanning device 217. The formed electrostatic latent image is a so-called negative latent image, and an image portion has been exposed.

Image writing is performed in the order of a yellow (Y) image, a magenta (M) image, a cyan (C) image, and a black (K) image in accordance with the rotation of the photoreceptor 210, and the formed electrostatic latent images are visualized as positive images by reversal development in the order of developing units Y (development is performed by a yellow toner), M (development is performed by a magenta toner), C (development is performed by a cyan toner), and K (development is performed by a black toner) of the turret-type developing device 213, and toner images of each of the colors are obtained. The obtained toner images are transferred by the transfer voltage-applying roller 214a in order, and overlapped on the transfer belt part 214, and become a color image.

The cassette 218 stores sheets of transfer paper S as a recording medium, and is attachable to and detachable from a body of the image-forming apparatus. In a state where the cassette 218 is attached as illustrated in FIG. 13, a top sheet of the transfer paper S stored in the cassette 218 is taken out and fed by the paper feeding roller 222, and then an edge portion of the sheet of the transfer paper S is received by the pair of registration rollers 219.

The pair of registration rollers 219 sends the sheet of the transfer paper S to a transfer part in synchronization with movement of the color image formed by the toners on the transfer belt part 214 to a transfer position. The sheet of the transfer paper S sent to the transfer part is overlapped with the color image in the transfer part, and the color image is electrostatically transferred by a function of the transfer roller 214b. The color image is pressed and transferred on the sheet of the transfer paper S by the transfer roller 214b at the time of transfer.

The sheet of the transfer paper S on which the color image has been transferred is sent to the fixing device 216, and the color image is fixed in the fixing device 216, and then the sheet of the transfer paper S on which the color image has been fixed passes on a conveyance path provided with a guide device (not illustrated), and is ejected onto the tray 221 by a pair of paper ejection rollers (not illustrated). Every time an image formed by each color toner is transferred, a surface of the photoreceptor 210 is cleaned by the cleaning device 215, and residual toners and paper dust are removed.

That is, the image-forming apparatus according to the tenth embodiment of the present invention is structured by using the image-reading device according to the eighth embodiment or the image-reading device according to the ninth embodiment, that is, the image-reading device using any one of the image-reading lens of Example 1 according to the fifth embodiment, the image-reading lens of Example 2 according to the sixth embodiment, and the image-reading lens of Example 3 according to the seventh embodiment as an image-forming lens.

Needless to say, the image-forming apparatus according to the embodiment of the present invention is not limited to only a structure which forms a color image, but it can be structured such that a monochrome image is formed.

Additionally, in an in-body paper ejection type and space-saving image-forming apparatus in which paper ejection is formed between an image-reading device and an image-forming device, by using an image-reading device using any one of the above-described image-reading lenses, it is possible to make an image-reading device thinner, and a distance between the image-reading device and the image-forming device increases, and visibility of outputted paper, or the like to a user is improved, and therefore, it is possible to obtain an effect of making operation easy.

Note that in the description of the embodiments of the present invention, the explanation has been made with the use of round lenses for all the lenses; however, in order to reduce the size of the lenses, in particular, the size in the direction of height of an image-reading device, it is possible to structure the image-reading lenses according to the embodiments of the present invention by using oval lenses in which an upper part and a lower part of the lenses are cut.

According to the embodiments of the present invention, it is possible to provide an image-reading lens in which an angle of view is equal to or more than 56°, and the number of lenses is equal to or less than that of Gauss-type lenses, and which maintains miniaturization, favorably corrects various aberrations, and obtains a high image quality.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. An image reading lens for reading a manuscript image, comprising:

a front-group lens system at an object side, and which includes less than or equal to 5 lenses, includes at least one positive lens, and includes at least one negative lens; and a rear-group lens system at an image side which includes only one lens which is a negative lens, wherein an angle of an entire system of the image-reading lens is equal to or more than 56°, and the front-group lens system and the rear-group lens system are structured such that a change in a distance between the front-group lens system and the rear-group lens system adjusts a lens performance, wherein the image-reading lens is configured to satisfy the following conditional expressions [1], [2], and [3]:

$$-1.00 < fr/f < -0.50 \quad [1]$$

$$1.0 < (Rc+Rb)/(Rc-Rb) < 1.5 \quad [2]$$

$$1.0 < Ra/Rb < 2.8 \quad [3]$$

where fr is a focal length of the rear-group lens system, f is a focal length of the entire system of the image-reading lens, Ra is a curvature radius of a lens surface at the image side of a lens at a most image side of the front-group lens system, Rb is a curvature radius of a lens surface at the object side of the negative lens of the rear-group lens system, and Rc is a curvature radius of a lens surface at the image side of the negative lens of the rear-group lens system, wherein the image-reading lens is configured to satisfy the following conditional expression [5]:

$$0.12 < (\text{ø}b - \text{ø}a)/2ds < 0.28 \quad [5]$$

where øa is an effective diameter of the lens surface at the image side of the lens at the most image side of the front-group lens system, øb is an effective diameter of the lens surface at the object side of the negative lens of the rear-group lens system, and ds is a distance on an optical axis between the front-group lens system and the rear-group lens system.

2. The image reading lens according to claim 1, wherein the image-reading lens is configured to satisfy the following conditional expression [4]:

$$0.2 < ds/D < 0.6 \quad [4]$$

where ds is a distance on an optical axis between the front-group lens system and the rear-group lens system, and D is an entire lens length.

3. The image reading lens according to claim 1, wherein at least one surface of the negative lens of the rear-group lens system includes an aspherical surface.

4. The image reading lens according to claim 1, wherein at least one lens surface of the front-group lens system includes an aspherical surface.

5. The image reading lens according to claim 1, wherein an outer shape of the negative lens of the rear-group lens system is not rotationally symmetric to an optical axis.

6. The image reading lens according to claim 5, wherein the outer shape of the negative lens of the rear-group lens system is longer in a main-scanning direction than in a sub-scanning direction.

7. An image reading device comprising:

an illumination system which illuminates a manuscript;

the image-forming lens according to claim 1 which forms a reduced image of reflected light of the manuscript illuminated by the illumination system; and an image sensor which photoelectrically converts the reduced image of the manuscript formed by the image-forming lens.

8. An image forming apparatus comprising the image reading device according to claim 7.

* * * * *